(12) United States Patent
Chino et al.

(10) Patent No.: US 6,809,157 B2
(45) Date of Patent: Oct. 26, 2004

(54) THERMOPLASTIC POLYMER AND THERMOPLASTIC ELASTOMER COMPOSITION

(75) Inventors: Keisuke Chino, Kanagawa Prefecture (JP); Makoto Ashiura, Kanagawa Prefecture (JP); Tetsuji Kawazura, Kanagawa Prefecture (JP); Masahiro Ikawa, Kanagawa Prefecture (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/883,239

(22) Filed: Jun. 19, 2001

(65) Prior Publication Data

US 2002/0022700 A1 Feb. 21, 2002

(30) Foreign Application Priority Data

Jun. 29, 2000 (JP) ........................................ 2000-196213
Apr. 20, 2001 (JP) ........................................ 2001-122598
Apr. 27, 2001 (JP) ........................................ 2001-131579

(51) Int. Cl.$^7$ ................................................. C08F 8/32
(52) U.S. Cl. ................................... 525/327.6; 525/376
(58) Field of Search ............................... 525/327.6, 376

(56) References Cited

U.S. PATENT DOCUMENTS

| | | | | |
|---|---|---|---|---|
| 4,863,623 A | * | 9/1989 | Nalesnik | 508/256 |
| 5,182,041 A | * | 1/1993 | Benfarmeo et al. | 508/241 |
| 5,651,927 A | * | 7/1997 | Auda et al. | 264/85 |
| 6,512,051 B2 | * | 1/2003 | Chino et al. | 525/203 |
| 6,573,331 B1 | * | 6/2003 | Camberlin et al. | 525/88 |
| 2001/0027235 A1 | * | 10/2001 | Onizawa | 525/133 |
| 2002/0086952 A1 | * | 7/2002 | Chino et al. | 525/327.6 |

FOREIGN PATENT DOCUMENTS

| | | |
|---|---|---|
| JP | 08-239583 | 9/1996 |
| JP | 2000-169527 | 6/2000 |

OTHER PUBLICATIONS

Lee et al., "The Glass Transition Temperatures of Polymers", Polymer Handbook, 2nd ed., Brandrup et al. ed., John Wiley & Sons, New York, pp 139–142 (1975).*
Standard Test Method for Glass Transition Temperatures by Differential Scanning Calorimetry or Differential Thermal Analysis ASTM E 1356–91, American Society For Testing & Materials, West Conshohocken, PA (Reapproved 1995).*
Alger, "Polymer Science Dictionary", 2nd ed., Chapman & Hall, New York pp. 187, 503 (1997).*

* cited by examiner

Primary Examiner—Bernard Lipman
(74) Attorney, Agent, or Firm—Finnegan, Henderson, Farabow, Garrett & Dunner, L.L.P.

(57) ABSTRACT

A thermoplastic polymer having a carbonyl-containing group and a nitrogen-containing 5-membered heterocycle-containing group in side chains, and a composition thereof. The thermoplastic polymer and composition thereof have excellent recycle property in that physical properties do not deteriorate even though formation of crosslinking and dissociation of crosslinking are repeatedly conducted with altering temperature. The thermoplastic polymer and composition thereof are that its crosslinked structure is considerably stable at room temperature, and therefore have considerably high tensile strength. In particular, in the case of bonding to a main chain at 3-position or 4-position of a nitrogen-containing 5-membered heterocycle, intermolecular hydrogen bond is caused, so that a cured product has high mechanical properties.

6 Claims, No Drawings

THERMOPLASTIC POLYMER AND THERMOPLASTIC ELASTOMER COMPOSITION

BACKGROUND OF THE INVENTION

1. Field of the Invention

The present invention relates to a thermoplastic polymer capable of repeatedly reformation of crosslinking and dissociation of crosslinkage with temperature, a method for producing the same, and a composition using the same.

The present invention also relates to a thermoplastic elastomer composition capable of repeatedly reformation of crosslinking and dissociation of crosslinking with temperature.

2. Description of the Related Arts

In recent years, reusage of waste materials is desired in view of environmental protection and resource saving. Vulcanized rubbers have stable three-dimensional networks in which polymer chain and vulcanizing agent are covalently bonded, and therefore show very strong strength, but are difficult to re-mold due to strongly covalent bond crosslinking. On the other hand, thermoplastic elastomers utilizing physical crosslinking state do not require complicated vulcanization and molding steps including pre-molding and the like, and therefore can easily be molded by heat melting.

Thermoplastic elastomer comprising a resin component and a rubber component, in which a crystal resin component forms a hard segment which serves as crosslinking point of a three-dimensional structure at room temperature to thereby prevent thermoplastic deformation of a rubber component (soft segment) whereby the thermoplastic elastomer plastically deforms by softening or fusion of the resin component with rising a temperature, is known as the representative example of such thermoplastic elastomers. However, such type of thermoplastic elastomers are liable to decrease rubber elasticity because of containing a resin component. For this reason, materials that do not contain a resin component and can impart thermoplasticity are demanded.

To solve the above problem, the present inventors previously proposed that an elastomer composition comprising an elastomer having a reaction site capable of forming hydrogen bonds and a compound having a reaction site capable of forming hydrogen bond together with the reaction site of the elastomer can repeats formation of crosslinking and dissociation of crosslinking by temperature difference utilizing hydrogen bond (JP-A-11-209524). Further, the same applicant as the present application proposed a hydrogen-bonding thermoplastic elastomer comprising an elastomeric polymer having a carbonyl-containing group and a heterocyclic amine-containing group in side chains, which is expected to have the similar effect in JP-A-2000-169527 (publication date: Jun. 20, 2000). JP-A-8-239583 describes organic polymers having a carbonyl-containing group and a nitrogen-containing heterocycle-containing group in side chains, wherein the nitrogen-containing heterocycle-containing ring-containing group is bonded to the main chain directly or through an organic group at a 2-position counted from nitrogen atom. Those elastomer compositions or organic polymers can sufficiently show melt flowability at a molding temperature of a thermoplastic resin such as olefin-based resin without modification, have excellent mechanical strength (breaking strength) at low temperature by the formation of crosslinking, and can repeatedly reformation of crosslinking and dissociation of crosslinking (softening).

Thermoplastic elastomers having such properties have very high value on industrial utilization and also very high value on environmental protection are expected for use as a material having further high crosslinking strength and having excellent recycle property, showing no change in physical properties even if formation of crosslinking and dissociation of crosslinking are repeated.

SUMMARY OF THE INVENTION

A first object of the present invention is to provide a thermoplastic polymer that sufficiently shows melt flowability at a molding temperature of ordinary thermoplastic resins, forms a stable crosslinking structure at room temperature, has rubber elasticity, and is capable of repeatedly rehardening and fluidization by altering the temperature, a method for producing the same, and a composition using the same.

By the way, the conventional thermoplastic elastomers described above have not been sufficient in shape retention when load is applied thereto in physical properties. Further, organic polymers described in JP-A-8-239583 have had the problems such that when a thermoplastic elastomer is used as a main chain, hardness is very small, and the properties are insufficient in using as an elastic material, such as using as a rubber material.

Accordingly, a second object of the present invention is to provide a thermoplastic elastomer composition which has a sufficient hardness in using as an elastic material and improved shape retention rate (compression set) without losing excellent recycle property and is capable of repeatedly rehardening and fluidization by altering the temperature.

As a result of extensive investigations to achieve the first object, the present inventors have found that when an elastomeric polymer is used as a main chain and a carbonyl-containing group and a nitrogen-containing five-membered heterocycle-containing group are contained in side chains, tensile strength under crosslinking is very high, further having the rubber elasticity, and capable of being easily softened approximately at 120° C. and even when formation of crossliking and dissociation of crosslinking are repeatedly conducted, physical properties do not decrease, making it possible to impart recycle property. The present invention has been completed based on this finding. It has also found that when an elastomeric polymer having a diene moiety of 5 mol % or less, such as EPM, EBM or EPDM; and a butyl rubber or a halogenated butyl rubber is used as the elastomeric polymer forming the main chain, and an elastomeric polymer having a carbonyl-containing group and a nitrogen-containing heterocycle-containing group in a specific proportion in side chains is used, excellent mechanical strength and recycle property can be imparted even if the nitrogen-containing heterocycle-containing group is not a five-membered ring regardless of the number of ring member of the heterocycle-containing group. The present invention has also be completed based on this finding. The term "mol %" used herein means a value on the basis of a monomer unit forming a polymer.

That is, a first aspect of the present invention provides a thermoplastic polymer having a carbonyl-containing group and a nitrogen-containing five-membered heterocycle-containing group in side chains.

A second aspect of the present invention provides a thermoplastic polymer having an elastomer as a main chain, in which a diene moiety is 5mol % or less, and a carbonyl-containing group and a nitrogen-containing heterocycle-containing group in side chains, wherein the proportion of side chain moiety is 0.1 to 50 mol % with respect to 100 mol % of the main chain moiety.

A third aspect of the present invention provides a thermoplastic polymer having an ethylene-propylene copolymer (EPM), an ethylene-butene copolymer (EBM) or an ethylene-propylene-diene copolymer (EPDM) as a main chain, and a carbonyl-containing group and a nitrogen-containing heterocycle-containing group in side chains, wherein the proportion of the side chain moiety is 0.1 to 50 mol % with respect to 100 mol % of the main chain moiety.

A fourth aspect of the present invention provides a thermoplastic polymer having a butyl rubber or a halogenated butyl rubber as a main chain, and a carbonyl-containing group and a nitrogen-containing heterocycle-containing group in side chains, wherein the proportion of the side chain moiety is 0.1 to 50 mol % with respect to 100 mol % of the main chain moiety.

In the second, third and fourth aspects, the nitrogen-containing heterocycle is preferably a five-membered ring or a six-membered ring.

In the first, second, third and fourth aspects, the carbonyl-containing group is preferably at least one member selected from the group consisting of amide, ester, imide and carboxy groups.

Further, the side chain preferably comprises at least one member selected from the group consisting of the following formulae (1), (2) and (3), which bonds to the main chain at α-position or β-position.

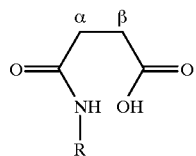
(1)

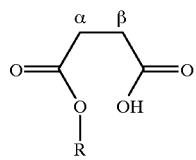
(2)

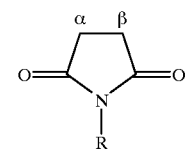
(3)

wherein R represents a nitrogen-containing heterocycle which is a five-membered ring in the first aspect, and is preferably five-membered ring in the second, third and fourth aspects.

In the first, second, third and fourth aspects, the thermoplastic polymer preferably has a glass transition temperature ($T_g$) of 25° C. or lower.

The present invention also provides a method for producing the thermoplastic polymer according to the first aspect, which comprises reacting a polymer having a cyclic acid anhydride group in a side chain with a nitrogen-containing five-membered heterocyclic compound at a temperature that the nitrogen-containing five-membered heterocyclic compound can chemically be bonded to the cyclic acid anhydride group. In a method for producing the thermoplastic polymers according to the second, third and fourth aspects, a polymer having a cyclic acid anhydride group in a side chain such as an elastomer having 5 mol % or less of diene moiety; EPM, EBM or EPDM; and a butyl rubber or a halogenated butyl rubber respectively is reacted with the nitrogen-containing heterocyclic compound at a temperature that the nitrogen-containing heterocyclic compound can chemically be bonded to the cyclic acid anhydride group.

The present invention further provides a rubber composition containing the thermoplastic polymer according to the first, second, third and fourth aspects of the present invention (hereinafter also simply referred to as "thermoplastic polymer of the present invention").

As a result of extensive investigations to achieve the second object of the present invention, the present inventors have found that the object can be achieved by selecting a thermoplastic elastomer having a nitrogen-containing heterocycle-containing group bonded to a main chain at a specific site as a thermoplastic elastomer having a carbonyl-containing group and a nitrogen-containing heterocycle-containing group in side chains and adding thereto a metal compound such as $ZnCl_2$ or $Zn(OCOC_{17}H_{35})_2$.

That is, a fifth aspect of the present invention provides a thermoplastic elastomer composition characterized by containing a thermoplastic elastomer having a carbonyl-containing group and a nitrogen-containing n-membered ring-containing group ($n \geq 3$) in side chains, wherein the nitrogen-containing n-membered ring-containing group is bonded to a main chain at 3-position to n-position directly or through an organic group, and a compound of at least one of metal elements selected from the group consisting of Group 2A, Group 3A, Group 4A, Group 5A, Group 6A, Group 7A, Group 8, Group 1B, Group 2B, Group 3B, Group 4B and Group 5B in the Periodic Table (hereinafter also referred to as a "metal compound").

The term "n-membered ring" used herein represents heterocycle by atomic number n constituting a ring, and "nitrogen-containing heterocycle" and "nitrogen-containing n-membered ring" have almost the same meaning in the fifth aspect of the present invention.

In the thermoplastic elastomer composition according to the fifth aspect of the present invention, the thermoplastic elastomer preferably has a structure represented by the following formula (4) in a side chain.

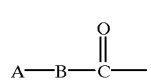
(4)

wherein A represents a nitrogen-containing n-membered ring-containing group bonded to a main chain at 3-position to n-position through an organic group ($n \geq 3$), and B represents an organic group which may contain O, N and S.

In the thermoplastic elastomer composition according to the fifth aspect of the present invention, the side chain of the thermoplastic elastomer is preferably represented by the following formula (5) or (6).

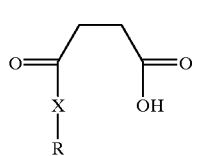
(5)

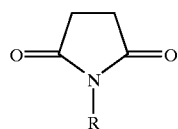

(6)

wherein R represents a nitrogen-containing n-membered ring-containing group bonded to a main chain at 3-position to n-position through an organic group (n≧3), and X represents O, S or NR' wherein R' represents H or an alkyl group having 1 to 10 carbon atoms.

In the thermoplastic elastomer composition according to the fifth aspect of the present invention, the metal compound added is preferably at least one member selected from the group consisting of $ZnX_2$, $CoX_2$, $FeX_2$, $FeX_3$, $MnX_2$, $NiX_2$, $CuX_2$, $PbX_2$, $CaX_2$, $BaX_2$, NaX, $AlX_3$, KX, $MgX_2$, LiX, ZnO, CoO, FeO, $Fe_2O_3$, MnO, NiO, CuO and PbO, wherein X represents F, Cl, Br, I, OCOR or OH wherein R represents an alkyl group having 1 to 20 carbon atoms.

The above-described thermoplastic elastomer can be produced by, for example, reacting an elastomeric polymer having a cyclic acid anhydride group in a side chain with a heterocyclic amine-containing compound at a temperature such that the heterocyclic amine-containing compound is capable of chemically bonding to the cyclic acid anhydride group.

DETAILED DESCRIPTION OF THE INVENTION

The present invention is described in detail below.
<First Aspect>

The thermoplastic polymer according to the first aspect of the present invention is characterized by having a carbonyl-containing group and a nitrogen-containing 5-membered heterocycle-containing group in side chains.

The elastomeric polymer constituting a main chain of the thermoplastic polymer according to the first aspect of the present invention is generally natural polymers or synthetic polymers, known as rubber elastic materials for vulcanization (crosslinking, hardening). Examples of such an elastomeric polymer include specifically diene-based rubbers such as natural rubber, isoprene rubber, butadiene rubber, 1,2-butadiene rubber, styrene-butadiene rubber, nitrile rubber or chloroprene rubber; olefin-based rubbers such as butyl rubber, ethylene-propylene-based rubber (EPDM, EPM), ethylene-butene rubber (EBM), chlorosulfonated polyethylene, acrylic rubber or fluororubber; epichlorohydrin rubbers; polysulfide rubbers; silicone rubbers and urethane rubbers. And these rubbers may be hydrogenated and/or halogenated.

The elastomeric polymer may be a thermoplastic elastomer containing a resin component, and examples thereof include polystyrene-based elastomeric polymers (e.g., SBS, SIS or SEBS), polyolefin-based elastomeric polymers, polyvinyl chloride-based elastomeric polymers, polyurethane-based elastomeric polymers, polyester-based elastomeric polymers and polyamide-based elastomeric polymers. And these elastomeric polymers may be hydrogenated and/or halogenated.

The elastomeric polymer may be either liquid or solid. Molecular weight of the elastomeric polymer is not particularly limited, and can appropriately be determined according to the purpose of use, crosslinking density or the like. However, liquid rubber is preferable in view of convenience in producing the thermoplastic polymer and in view of flowability when heating the thermoplastic polymer (decrosslinking). The molecular weight is preferably a molecular weight showing liquid. For example, a weight average molecular weight is preferably 1,000 to 100,000, more preferably about 1,000 to 50,000, in the diene-based rubbers such as isoprene rubber or butadiene rubber. On the other hand, where strength is considered important, solid rubber is particularly preferable. For example, a weight average molecular weight is preferably 100,000 to 2,000,000, more preferably 500,000 to 1,500,000, in diene-based rubbers such as isoprene rubber or butadiene rubber.

The thermoplastic polymer of the present invention is such that a carbonyl-containing group and a nitrogen-containing 5-membered ring-containing group are introduced into the side chain of the above elastomeric polymer.

Examples of the carbonyl-containing group include amide, ester, imide and carboxy groups. Compounds which can introduce such a group are not particularly limited, and examples thereof include carboxyic acid compounds and their derivatives.

Examples of the carboxyic acid include organic acids having saturated or unsaturated hydrocarbon group. The hydrocarbon group may be any of aliphatic, alicyclic and aromatic carboxyic acids. Further, examples of the carboxyic acid derivatives include carboxyic anhydrides, esters, ketones, amino acids, amides, imides and thiocarboxyic acids (mercapto group-containing carboxyic acid).

Specific examples of carboxyic acid compounds and their derivatives are as follows:

Carboxylic acids and substituent-containing carboxyic acids, such as malonic acid, maleic acid, succinic acid, glutaric acid, phthalic acid, isophthalic acid, terephthalic acid, p-phenylenediacetic acid, p-hydroxybenzoic acid, p-aminobenzoic acid or mercaptoacetic acid;

Acid anhydrides such as succinic anhydride, maleic anhydride, glutaric anhydride, phthalic anhydride, propionic anhydride or benzoic anhydride;

Aliphatic esters such as maleic acid ester, malonic acid ester, succinic acid ester, glutaric acid ester or ethyl acetate, aromatic esters such as phthalic acid ester, isophthalic acid ester, terephthalic acid ester, ethyl-m-aminobenzoate or methyl-p-hydroxybenzoate;

Ketones such as quinone, anthraquinone or naphthoquinone;

Amino acids such as glycine, tyrosine, vicine, alanine, valine, leucine, cerin, threonine, lysine, asperagillic acid, glutamic acid, cystein, methionine, proline or N-(p-aminobenzoyl)-β-alanine;

Amides such as maleinamide, maleinamide acid (maleinmonoamide), succinic acid monoamide, 5-hydroxybarrelamide, N-acetylethanol amine, N,N'-hexamethylenebis(acetamide), malonamide, cycloserine, 4-acetamide phenol or p-acetamidobenzoic acid;

Imides such as maleic imide or succinic imide.

Of those, carbonyl-containing groups derived from cyclic anhydride such as succinic anhydride, maleic anhydride, glutaric anydride, or phthalic anhydride are preferable, and the carbonyl-containing group derived from maleic anhydride is more preferable.

The nitrogen-containing 5-membered heterocycle-containing group in the first aspect of the present invention is not particularly limited so long as it contains nitrogen atom in the heterocycle, and may contain hetero atoms such as sulfur atom, oxygen atom or phosphorus atom in the heterocycle, other than nitrogen atom. The heterocycle may have substituents. Examples of the substituent include alkyl groups such as methyl group, ethyl group, (iso)propyl group or hexyl group; alkoxy groups such as methoxy group, ethoxy group or (iso)propoxy group; groups comprising halogen atoms such as fluorine, iodine or chlorine; cyano groups; amino groups; aromatic hydrocarbon groups; ester groups; ether groups; acyl groups; and thioether groups. Those may be used in combination. Substitution position of those groups is not particularly limited, and the number of substituents is also not limited. The heterocycle may have or may not have aromaticity, but preferably has the aromaticity in that tensile strength at crosslinked state is further increased.

The nitrogen-containing 5-membered heterocycle-containing group may be such that the nitrogen-containing 5-membered heterocycle is bonded to the main chain by directly covalently bonding thereto. However, it is preferable to have a bonding group between the heterocycle and the elastomeric polymer constituting the main chain and thus the heterocycle is chemically bonded (covalently bonded) to the main chain through the bonding group. Preferable examples of such a bonding group include amide group, methylene group, ethylene group and ester group. Of those, amide group is preferable because of forming a complementary hydrogen bond. The bonding position of the nitrogen-containing heterocycle and the bonding group is not particularly limited. The heterocycle and the bonding group may be bonded to each other, and the substituent in the heterocycle and the bonding group may be bonded to each other. Bonding at 3-position or 4-position of the nitrogen-containing heterocycle is preferable in that intermolecular hydrogen bond occurs, so that mechanical properties of a cured product increase, as compared with bonding at 2-position involving intramolecular hydrogen bond. Bonding at 3-position is particularly preferable. It is preferable that the heterocycle has the nitrogen atoms of 2 or more, more preferably 3. Preferable nitrogen-containing 5-membered heterocycle-containing group is that the bonding group between the nitrogen-containing 5-membered heterocycle and the main chain is an amide group having three nitrogen atoms, and the amide group is bonded to the nitrogen-containing 5-membered heterocycle at 3-position or 4-position thereof.

Representative examples of the nitrogen-containing 5-membered heterocycle used in the present invention are preferably the following compounds. Those may have various substituents, or may be hydrogenated or dehydrogenated.

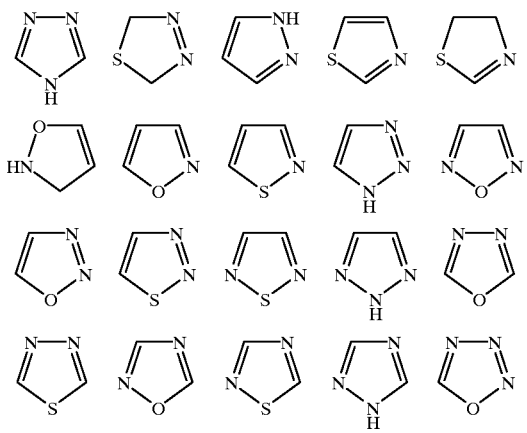

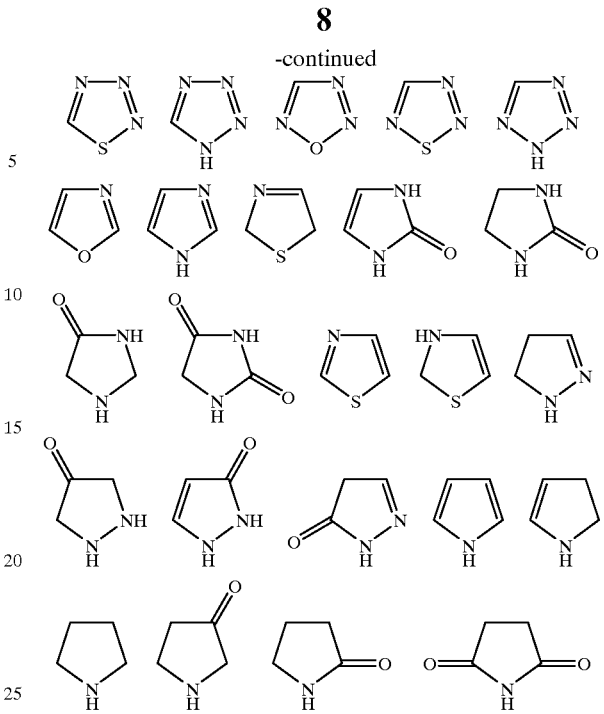

Compounds obtained by condensing benzene ring to the above monocyclic heterocycles or condensing the above monocyclic heterocycles each other can also be used, and examples of the condensed rings include the following compounds.

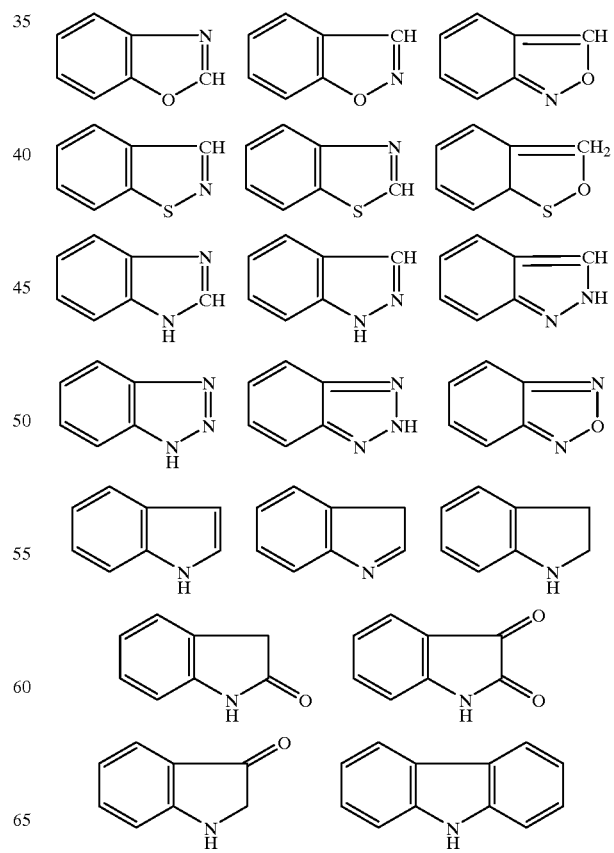

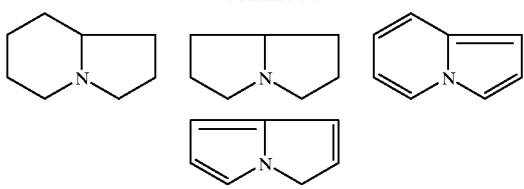

The nitrogen-containing 5-membered heterocycle-containing group of the present invention is introduced by a nitrogen-containing 5-membered heterocyclic compound containing the nitrogen-containing 5-membered heterocycle and a group capable of covalently bonding with an elastomeric polymer constituting the main chain. Examples of such a group include amino group, hydroxy group, carboxy group, thiol group and sulfide group.

The thermoplastic polymers according to the first aspect of the present invention is a thermoplastic polymer having the above-mentioned carbonyl-containing group and nitrogen-containing 5-membered ring-containing group in side chains. Those groups are covalently bonded to side chains of the elastomeric polymer. Those groups may be bonded to the main chain as an independent side chain, or may have the carbonyl group and the nitrogen-containing 5-membered ring-containing group on the same side chain in the branched form. It is preferable to arrange them on the same side chain from the standpoint of synthesis, and examples thereof include groups having the structure shown by the following formulae (1), (2) and (3).

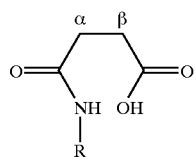
(1)

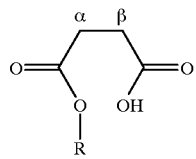
(2)

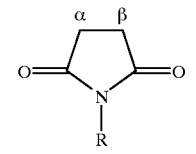
(3)

wherein R represents a nitrogen-containing 5-membered heterocycle, and the above-mentioned 5-membered heterocycles are exemplified.

The structure shown by the above formulae (1), (2) and (3) preferably bonds to the elastomeric polymer at α-position or β-position in the respective formula.

The proportion of the side chain moiety constituted of those groups is preferably 0.1 to 50 mol %, more preferably 1 to 15 mol %, with respect to 100 mol % of the main chain moiety. This proportion is preferably that monomers introduced in the side chain moiety is about 0.1 to 35 mol % per unit mol of isoprene monomer in the case that the main chain moiety is isoprene rubber. Within this range, interaction of those side chains between molecules or in the molecule is well balanced, and as a result, the thermoplastic polymer having very high tensile strength at crosslinked state and rubber elasticity can be obtained. This thermoplastic polymer is heated to 120° C. or higher to dissociate a three-dimensional crosslinked structure, thereby imparted thereto flowability. This is considered that interaction of side chains each other is weakened. If the proportion of the side chain moiety is less than 0.1 mol % with respect to 100 mol % of the main chain moiety, strength at crosslinked state is not sufficient, and if it exceeds 50 mol %, rubber elasticity is lost, which are not preferable.

The ratio of the carbonyl-containing group to the nitrogen-containing 5-membered ring-containing group is not particularly limited, but the ratio of 2 to 1 makes it easy to form a complementary interaction, which is preferable.

The thermoplastic polymer according to the first aspect of the present invention preferably has a glass transition temperature ($T_g$) of 25° C. or less in the case that it is desired to obtain the desired rubber elasticity at room temperature.

The method for producing the thermoplastic polymer according to the first aspect of the present invention is not particularly limited, and the thermoplastic polymer can be prepared by the conventional methods.

Among the thermoplastic polymers according to the first aspect of the present invention, the thermoplastic polymer having the carbonyl-containing group and the nitrogen-containing 5-membered heterocycle-containing group on the same side chain is obtained by, for example, reacting an elastomeric polymer modified with a carbonyl-containing group with a compound capable of introducing the nitrogen-containing 5-membered heterocycle-containing group to thereby covalently bond the carbonyl-containing group and the nitrogen-containing 5-membered heterocycle-containing group.

The elastomeric polymer modified with the carbonyl-containing group is obtained by, for example, reaction of diene-based rubber such as butadiene and maleic anhydride or mercaptoacetic acid in toluene at room temperature or under heating in a nitrogen atmosphere for 5 hours, precipitating the reaction mixture in methanol, and drying the precipitate under reduced pressure.

Commercially available products can be used as such a modified elastomeric polymer, and examples thereof include maleic anhydride-modified isoprene rubbers such as LIR-403 (a product of Kuraray Co.) or LIR-410A (a sample of Kuraray Co.); carboxy-modified isoprene rubbers such as LIR-410 (a product of Kuraray Co.); carboxy-modified nitrile rubbers such as Krynac 110 (a product of Polyser Co.), Krynac 221 (a product of Polyser Co.) or Krynac 231 (a product of Polyser Co.); carboxy-modified polybutenes such as CPIB (a product of Nisseki Chemical Co.) or HRPIB (a laboratory sample by Nisseki Chemical Co.); Neucurrel (a product of Mitsui du Pont Polychemical Co.); and Yukalon (a product of Mitsubishi Chemical).

Further, the respective compounds capable of introducing the carbonyl-containing group and the nitrogen-containing 5-membered heterocycle-containing group are previously bonded each other, and the resulting bonded compound can then be bonded to the side chain of the elastomeric polymer.

In the case of preparing the thermoplastic polymer having the carbonyl-containing group and the nitrogen-containing 5-membered heterocycle-containing group independently on the side chain, the thermoplastic polymer may directly be prepared by copolymerizing a monomer capable of forming a main chain with a copolymerizable monomer capable of introducing the above groups. Alternatively, a main chain (elastomeric polymer) may previously be formed by polymerization or the like, and the main chain may then be graft modified with a compound capable of introducing the above groups.

In each of the above production methods, it can be confirmed by general analyzing means such as NMR or IR spectrum if each group on the side chain of the elastomeric polymer is independently bonded, or is mutually bonded.

In the first aspect of the present invention, it is preferable that the carbonyl-containing group and the nitrogen-containing 5-membered heterocycle-containing group are bonded to the same side chain of the elastomeric polymer previously formed, and it is more preferably that the modified elastomeric polymer having cyclic acid anhydride in a side chain and the nitrogen-containing 5-membered heterocyclic compound are reacted at a temperature which enables the nitrogen-containing 5-membered heterocyclic compound and the cyclic acid anhydride group to chemically bond (for example, covalent bond, ionic bond), thereby bonded to each other (and the acid anhydride is ring-opened by this reaction). The temperature which enables the nitrogen-containing 5-membered heterocyclic compound and the cyclic acid anhydride group to chemically bond varies depending on the kind of compounds, but the temperature is generally about room temperature to 200° C. The reaction time is generally about 3 to 5 hours.

<Second Aspect>

The second aspect of the present invention is explained below.

The second aspect of the present invention provides a thermoplastic polymer having an elastomer as a main chain, in which a diene moiety is 5 mol % or less, and a carbonyl-containing group and a nitrogen-containing heterocycle-containing group in side chains, wherein the proportion of side chain moiety is 0.1 to 50 mol % with respect to 100 mol % of the main chain moiety. The thermoplastic polymer in which a main chain comprises an elastomer having a diene moiety of 5 mol % or less, according to the second aspect of the present invention has specific side chains as mentioned above, and therefore can give a crosslinked product of the thermoplastic polymer, having high mechanical strength as compared with a cured product obtained by sulfur vulcanizing an elastomers having no side chain. In particular, tensile strength and elongation at break are high. This improvement is remarkable when compared with a polymer comprising an elastomer having a large content of diene moiety as a main chain, such as isoprene, and this improvement has not conventionally be predicted. That is, the second aspect of the present invention provides a method of imparting a heat reversible plasticity to an elastomers having a diene moiety of 5 mol % or less by introducing the carbonyl-containing group and the nitrogen-containing heterocycle-containing group to the side chain of the elastomers having diene moiety of 5 mol % or less in the proportion of 0.1 to 50 mol % per 100 mol % of the main chain moiety, thereby increasing tensile strength and elongation at break.

The elastomers according to the second aspect of the present invention are explained below by referring to the elastomers wherein ethylene-propylene copolymer (EPM), ethylene-butene copolymer (EBM) or ethylene-propylene-diene copolymer (EPDM) is used as the main chain, or the elastomers wherein butyl rubber or halogenated butyl rubber is used as the main chain, as the representative examples of the elastomers having the diene moiety of 5 mol % or less, but the elastomers according to the second aspect of the present invention are not limited to those main chains. Other elastomers that can be used in the present invention include, for example, acrylic rubbers, polysulfide rubbers, silicone rubbers and urethane rubbers.

Third and fourth aspects are explained below as the example of the second aspect of the present invention. Specific explanation to the second aspect of the present invention is the same as the explanation of the following third and fourth aspects.

<Third Aspect>

Further, the third aspect of the present invention will be explained.

The thermoplastic polymer according to the third aspect of the present invention is characterized by having ethylene-propylene copolymer (EPM), ethylene-butene copolymer (EBM) or ethylene-propylene-diene copolymer (EPDM) as the main chain and having the carbonyl-containing group and the nitrogen-containing heterocycle-containing group in the side chains.

The diene generally used is dicyclopentadiene, 5-ethylidene-2-norbornene, 1,4-hexadiene or the like. There is the case that besides propylene, 1-butene is used.

When EPM, EBM or EPDM is used as the main chain, tensile strength at crosslinked state is further improved as compared with the case of using other polymers listed in the first aspect. EPM, EBM and EPDM maybe liquid or solid, and its molecular weight is not particularly limited. Solid is preferable in obtaining high physical properties. EPM, EBM and EPDM each have a weight average molecular weight of about 1,000 to 2,000,000, preferably about 100,000 to 1,000,000.

The thermoplastic polymer according to the third aspect of the present invention is such that the carbonyl-containing group and the nitrogen-containing heterocycle-containing group are introduced in side chains into the main chain constituted of the above-mentioned EPM, EBM or EPDM. That is, the third aspect of the present invention provides a method for imparting heat reversible plasticity to EPM, EBM or EPDM by introducing the carbonyl-containing group and the nitrogen-containing heterocycle-containing group to the side chain of the polymer constituted of EPM, EBM or EPDM in the proportion of 0.1 to 50 mol % per 100 mol % of the main chain, thereby increasing tensile strength and elongation at break.

The carbonyl-containing groups that can be used in the third aspect are the same as exemplified in the first aspect, and compounds capable of introducing the carbonyl group and preferable examples thereof are also the same as exemplified in the first aspect.

In the third aspect of the present invention, by making the main chain skeleton as above, even if the nitrogen-containing heterocycle contained in the nitrogen-containing heterocycle-containing group is not limited to a 5-membered ring, the thermoplastic polymer obtained has sufficiently high strength at crosslinked state, and 3 to 8-polymembered rings, condensed rings and the like can widely be used.

The nitrogen-containing heterocycle used in the third aspect is not only a 5-membered ring, but is not particularly limited so long as it contains nitrogen atoms in the heterocycle. The heterocycle may contain hetero atoms such as sulfur atom, oxygen atom or phosphorus atom, other than nitrogen atom. Examples of the heterocycle include nitrogen-containing 5-membered heterocycles or nitrogen-containing 6-membered rings exemplified in the first aspect, pyrrololine, pyrrolidone, oxyindole (2-oxyindole), indoxyl (3-oxyindoxyl), dioxyindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythlin, imidazole, pyrazole, triazole, tetrazole, benzimidazole, benzopyrazole, benzotriazole, imidazoline, imidazolone, imidazolidone, hydantoin, pyrazoline, pyrazolone, indazole, pyridoindole, purine, cinnoline, pyrrole, pyrroline, indole, indoline, oxindole, carbazole, phenothiazine, indolenine, isoindole, oxazoles, thiazoles, isooxazoles, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisooxazole, anthranyl, benzothiazole, benzofurazane, pyridine, quinoline, isoquinoline, acridine, phenanthridine, anthrazoline, naphthilidine, thiazine, pyridazine, pyrimidine, quinazoline, quinoxaline, triazine, histidine, triazolidine, melamine, adenine, guanine, thymine, cytosine and the like. The nitrogen-containing heterocycle may contain other hetero atoms therein. The heterocycle may have substituents. Examples of the substituent include alkyl groups such as methyl group, ethyl group, (iso)propyl group or hexyl group; alkoxy groups such as methoxy group, ethoxy group or (iso)propoxy group; groups comprising halogen atoms such as fluorine, iodine or chlorine; cyano groups; amino groups; aromatic hydrocarbon groups; ester groups; ether groups; acyl groups; and thioether groups. Those substituents may be used in combination. The substitution position of those substituents is not particularly limited, and the number of substituents is also not limited. Further, the heterocycle may have or may not have aromaticity, but it is preferable to have the aromaticity as the same as in the first aspect. Use of the nitrogen-containing 5-membered heterocycle is advantageous in exhibiting strong hydrogen bond.

The nitrogen-containing 5-membered heterocycle-containing group in the third aspect of the present invention may be that the heterocycle is directly bonded to the main chain, but it is preferable to have a bonding group between the heterocycle and EPM, EBM or EPDM constituting the main chain. The bonding group is preferably ones exemplified in the first aspect, and examples thereof include amide group, methylene group, ethylene group and ester group. Of those, amide group is particularly preferable because of forming a complementary hydrogen bond. Similar to the first aspect, the bonding position between the heterocycle and the bonding group is not particularly limited. The heterocycle and the bonding group may be bonded, and the substitutent that the heterocycle has and the bonding group may be bonded.

The nitrogen-containing heterocycle group is introduced by a nitrogen-containing heterocyclic compound containing a group capable of covalently bonding with EPM, EBM or EPDM constituting the main chain.

Examples of the group capable of covalently bonding with an elastomeric polymer constituting the main chain include amino group, hydroxy group, carboxy group, thiol group, sulfide group and the like.

The nitrogen-containing heterocycle is preferably nitrogen-containing 5-membered heterocycle in that the thermoplastic polymer obtained has particularly high tensile strength at crosslinked state.

When the main chain (or bonding group) is bonded to the nitrogen-containing 5-membered heterocycle at 3-position or 4-position thereof, intermolecular hydrogen bond occurs as opposed to intramolecular hydrogen bond when bonded at 2-position, and as a result, a cured product has high mechanical properties, which is preferable. Bonding at 3-position is particularly preferable. The number of nitrogen atoms in the heterocycle is preferably 2 or more, more preferably 3. It is particularly preferable that the bonding group between the main chain and the heterocycle is amide group and the amide group is bonded to the nitrogen-containing 5-membered heterocycle having 3 nitrogen atoms at 3-position or 4-position.

The thermoplastic polymer according to the third aspect of the present invention may be that the carbonyl-containing group and the nitrogen-containing heterocycle-containing group are bonded to the main chain as the respective independent side chain, or that those are branched in the same side chain. Even in the third aspect, the thermoplastic polymer having those groups in the same side chain is preferable so that it can easily be synthesized. In particular, it is preferable to have the structures shown by the above formulae (1), (2) and (3) as shown in the first aspect. In the formulae, R represents a nitrogen-containing heterocycle, which preferably includes the above exemplified nitrogen-containing heterocycles. Among those, 5-membered nitrogen-containing heterocycle is more preferable because of excellent strength properties. The bonding site is preferably α-position or β-position.

In the thermoplastic polymer having the above structure according to the third aspect of the present invention, the proportion of the side chain moiety comprising the carbonyl-containing group and the nitrogen-containing heterocycle-containing group is 0.1 to 50 mol %, preferably 1 to 20 mol %, per 100 mol % of the main chain moiety comprising EPM, EBM or EPDM. Within this range, a thermoplastic elastomer having well-balanced interaction due to those side chains between molecules or in molecule, considerably stable crosslinked structure and also rubber elasticity can be obtained. When the thermoplastic elastomer is heated to 120° C. or higher, the crosslinked structure disintegrates, thereby flowability is imparted. If the proportion of the side chain moiety is less than 0.1 mol % per 100 mol % of the main chain moiety, tensile strength at crosslinked state is not sufficient, and if it exceeds 50 mol %, rubber elasticity is lost, which are not preferable. The ratio of the carbonyl-containing group to the nitrogen-containing heterocycle-containing is not particularly limited, but it is preferable that the ratio thereof be 2 to 1 in view of a complementary hydrogen bond.

Even in the thermoplastic polymer according to the third aspect of the present invention, its glass transition temperature ($T_g$) is preferably 25° C. or lower in order to obtain the desired rubber elasticity.

A method for producing the thermoplastic polymer according to the third aspect of the present invention is not particularly limited, and the thermoplastic polymer can be prepared by the same methods as shown in the first aspect. That is, the polymer having the carbonyl-containing group and the nitrogen-containing heterocycle-containing group in the same side chain is obtained by, for example, reacting EPM, EBM or EPDM modified with the carbonyl-containing group with a compound capable of introducing the nitrogen-containing heterocycle-containing group. The EPM, EBM or EPDM modified with the carbonyl-containing group is obtained by reacting EPM, EBM or EPDM in a toluene containing maleic anhydride or mercaptoacetic acid, similar to the first aspect.

Commercially available products can be used as the modified EPM, EBM or EPDM, and examples thereof include Toughmer TAFMER MP0610 and MP0620, products of Mitsui Chemical Co.

It is also possible to take a method that the respective compounds capable of introducing the carbonyl-containing group and the nitrogen-containing heterocycle-containing group are previously bonded, and the bonded compounds are then bonded to EPM, EBM or EPDM.

Even in the case of synthesizing the thermoplastic polymer having the carbonyl-containing group and the nitrogen-containing heterocycle-containing group as the respective independent side chain, the polymer can be produced in the same manner as in the first aspect.

In the third aspect of the present invention, it is also preferable that the carbonyl-containing group and the nitrogen-containing heterocycle-containing group are bonded in the same side chain of EPM, EBM or EPDM, and it is particularly preferable that EPM, EBM or EPDM having the cyclic acid anhydride in a side chain and a nitrogen-containing heterocyclic compound are reacted at a temperature capable of chemical bonding the carbonyl-containing group and the nitrogen-containing heterocycle-containing group, thereby bonding to each other. The temperature capable of chemical bonding the carbonyl-containing group and the nitrogen-containing heterocycle-containing group is generally room temperature to about 150° C., and the reaction time is generally about 3 to 5 hours.

<Fourth Aspect>

Further, the fourth aspect of the present invention will be explained.

The thermoplastic polymer according to the fourth aspect of the present invention is a thermoplastic polymer having butyl rubber or halogenated butyl rubber as a main chain and the carbonyl-containing group and the nitrogen-containing heterocycle-containing group in side chains, wherein the portion of the side chain moiety is 0.1 to 50 mol % per 100 mol % of the main chain moiety.

The butyl rubber is a copolymer of isobutylene and a small amount of isoprene. The halogenated butyl rubber is obtained by halogenating the isoprene moiety of the butyl rubber, and chlorinated butyl rubber and brominated butyl rubber are commercially available. Further, there are partially crosslinked butyl rubber, liquid butyl rubber, star-shaped and branched butyl rubber having high molecular weight, butyl rubber which is obtained by copolymerizing p-bromomethylstyrene and p-methylstyrene and the like as the peculiar butyl rubber. The butyl rubber or halogenated butyl rubber that can be used in the fourth aspect of the present invention can be any of the butyl rubbers. The butyl rubber or halogenated butyl rubber may be liquid or solid, and its molecular weight is not particularly limited. Solid rubber is preferable because of high physical properties. The rubber has a weight-average molecular weight of 1,000 to 2,000,000, preferably 100,000 to 1,000,000.

The carbonyl-containing group and the nitrogen-containing heterocycle used in the fourth aspect of the present invention are the same as explained in second aspect.

Similar to the third aspect, the structure of the side chain preferably has the structure represented by the formulae (1), (2) and (3) as shown in the first and second aspects.

It is preferable for the nitrogen-containing heterocycle to be 5-membered heterocycle for the reason that the thermoplastic polymer obtained has particularly high tensile strength at crosslinked state. When the main chain (or bonding group) is bonded to the nitrogen-containing 5-membered heterocycle at 3-position or 4-position thereof, intermolecular hydrogen bond occurs as opposed to intramolecular hydrogen bond when bonded at 2-position, and as a result, a cured product has high mechanical properties, which is preferable. Bonding at 3-position is particularly preferable. The number of nitrogen atoms in the heterocycle is preferably 2 or more, more preferably 3. It is particularly preferable that the bonding group between the main chain and the heterocycle is amide group and the amide group is bonded to the nitrogen-containing 5-membered heterocycle having 3 nitrogen atoms at 3-position or 4-position.

In the thermoplastic polymer according to the fourth aspect of the present invention, the proportion of the side chain moiety comprising the carbonyl-containing group and the nitrogen-containing heterocycle-containing group is 0.1 to 50 mol %, preferably 1 to 20 mol %, per 100 mol % of the main chain moiety comprising butyl rubber or halogenated butyl rubber. Within this range, a thermoplastic elastomer having well-balanced interaction due to those side chains between molecules or in molecule and considerably stable crosslinked structure, and showing higher tensile strength and elongation at break than vulcanized butyl rubber or halogenated butyl rubber having no side chain used in the present invention is obtained.

That is, the fourth aspect of the present invention provides a method for imparting a heat reversible plasticity to the butyl rubber or halogenated butyl rubber by introducing the carbonyl-containing group and the nitrogen-containing heterocycle-containing group into the side chain of butyl rubber or halogenated butyl rubber such that the proportion of the side chain moiety is 0.1 to 50 mol % per 100 mol % of the main chain moiety, thereby increasing tensile strength and elongation at break.

When this thermoplastic polymer is heated to 120° C. or higher, the crosslinked structure disintegrates, thereby flowability is imparted. If the proportion of the side chain moiety is less than 0.1 mol % per 100 mol % of the main chain moiety, strength at crosslinked state is not sufficient, and if it exceeds 50 mol %, rubber elasticity is lost, which are not preferable.

The ratio of the carbonyl-containing group and the nitrogen-containing heterocycle-containing group is not particularly limited, but the ratio is preferably 2 to 1 in view of a complementary hydrogen bond.

Even in the thermoplastic polymer according to the fourth aspect of the present invention, its glass transition temperature ($T_g$) is preferably 25° C. or lower in order to obtain the desired rubber elasticity.

A method for producing the thermoplastic polymer according to the fourth aspect of the present invention is not particularly limited, and the polymer can be synthesized by the same methods as shown in the second aspect.

That is, the polymer having the carbonyl-containing group and the nitrogen-containing heterocycle-containing group in the same side chain is obtained by, for example, reacting butyl rubber or halogenated butyl rubber modified with the carbonyl-containing group with a compound capable of introducing the nitrogen-containing heterocycle-containing group. Other production methods that can be used are the same as explained in the second and third aspects.

The thermoplastic polymer of the present invention obtained above contains the carbonyl-containing group and the nitrogen-containing heterocycle-containing group. Therefore, recycle property can be imparted to an elastomeric polymer which is the main chain component which could not be re-formed after the polymer is once crosslinked. Those groups can interact between molecules or in the molecule, so that a three-dimensional crosslinked structure can be formed by this intermolecular interaction. At a temperature of 120° C. or lower, the crosslinked structure is maintained in considerably stable manner, and the polymer also has rubber elasticity. However, when the temperature rises to higher than 120° C., the crosslinked structure dissociates, thereby showing flowability. This is considered that since molecular mobility is active, the hydrogen bond site disintegrates and as a result, the crosslinked structure cannot be maintained.

Thus, the thermoplastic polymer of the present invention has thermoplasticity, and has particularly high tensile strength at crosslinked state when the nitrogen-containing heterocycle-containing group is 5-membered ring. Further, even when the nitrogen-containing heterocycle-containing group is not 5-membered ring, the thermoplastic polymer having high tensile strength is similarly obtained in the case where EPM, EBM or EPDM is used as the main chain. In the case where butyl rubber or halogenated butyl rubber is used as the main chain, tensile strength and elongation at break are higher than those of butyl rubber or halogenated butyl rubber, having not particular side chain.

As described above, the thermoplastic polymer of the present invention has considerably stable crosslinked structure and also rubber elasticity. Even after the thermoplastic polymer is softened by elevating the temperature to higher than 120° C., physical properties such as moldability or tensile properties do not deteriorate, and strength after re-molding is maintained. Thus, recycle property is very excellent.

<Fifth Aspect>

The fifth aspect of the present invention is explained below.

In the thermoplastic elastomer composition according to the fifth aspect of the present invention, the thermoplastic elastomer has carbonyl-containing group and nitrogen-containing n-membered ring-containing group in the side chain of an elastomeric polymer which is a natural polymer or a synthetic polymer, and the nitrogen-containing n-membered ring-containing group is bonded to the main chain at 3-position to n-position directly or through an organic group. The term "having carbonyl-containing group and nitrogen-containing n-membered ring-containing group in the side chain" used herein means that the carbonyl-containing group and the nitrogen-containing n-membered ring-containing group are chemically and stably bonded (covalently bonded) to atoms (generally carbon atom) constituting the main chain of the elastomeric polymer. Further, n in the nitrogen-containing n-membered ring-containing group used herein is an integer of 3 or more.

The elastomeric polymer constituting the main chain of the thermoplastic elastomer according to the fifth aspect is the same as the elastomeric polymer constituting the thermoplastic polymer according to the first aspect as described above.

The thermoplastic elastomer according to the fifth aspect is that the carbonyl-containing group is introduced in the side chain of the above-described elastomeric polymer. The carbonyl-containing group is the same as the carbonyl-containing group used in the thermoplastic polymer according to the first aspect as described above.

The thermoplastic elastomer of the present invention has, in addition to the carbonyl-containing group, the nitrogen-containing n-membered ring-containing group in the side chain of the elastomeric polymer, and the nitrogen-containing n-membered ring-containing group is bonded to the main chain at 3-position to n-position directly or through a organic group.

The nitrogen-containing n-membered ring has the structure in which hydrogen-bondable amino group is contained in the ring member or hydrogen-bondable amino group generates. Such a nitrogen-containing n-membered ring is the same as the nitrogen-containing heterocycle used in the third aspect as described above. Of the nitrogen-containing n-membered rings, the following compounds are preferably exemplified as the nitrogen-containing 5-membered ring. Those may have various substituents, or may be hydrogenated or dehydrogenated.

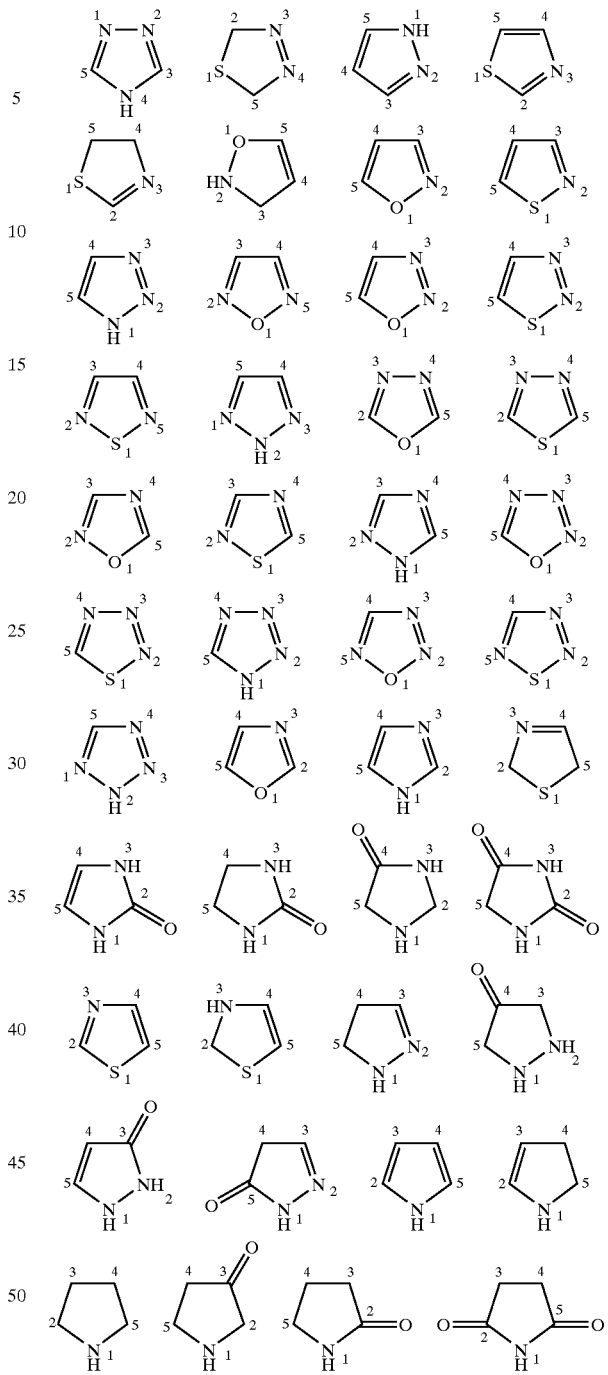

The following compounds are preferably exemplified as the nitrogen-containing 6-membered ring. Those may also have various substituents, or may be hydrogenated or dehydrogenated.

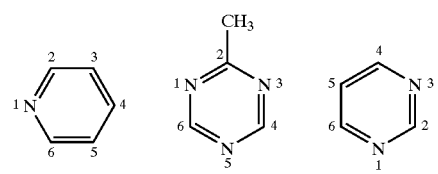

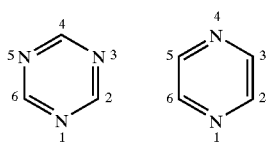

Compounds obtained by condensing the monocyclic n-membered rings each other can be used, and examples thereof include the following condensed rings.

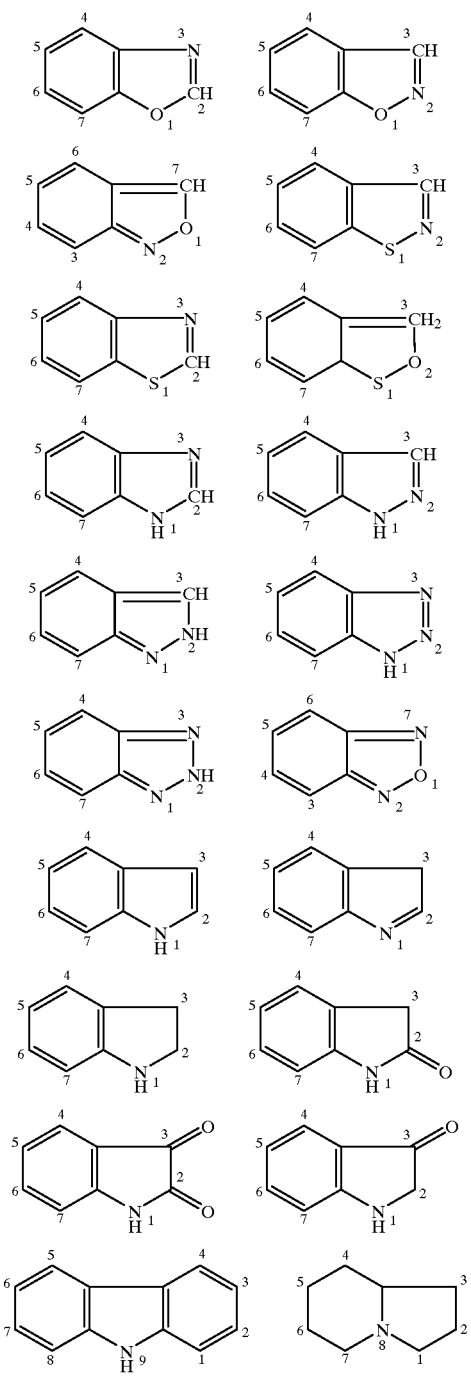

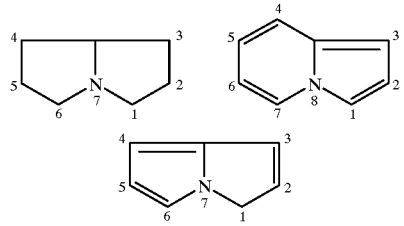

In the thermoplastic elastomer composition of the present invention, the carbonyl-containing group and the nitrogen-containing n-membered ring-containing group may be bonded to the polymer main chain as the respective independent side chain, or may be bonded to the main chain through a different group, thereby forming the side chain by the carbonyl-containing group and the nitrogen-containing n-membered ring-containing group. In such a case where the carbonyl-containing group and the nitrogen-containing n-membered ring-containing group forms one side chain, not only the side chain is chemically bonded to the main chain, but also the carbonyl-containing group and the nitrogen-containing n-membered ring-containing group are also chemically bonded. The carbonyl-containing group and the nitrogen-containing n-membered ring-containing group may be bonded through any bonds.

Preferably, the carbonyl-containing group and the nitrogen-containing n-membered ring-containing group are bonded through any bonding to thereby form one side chain, and more preferably, the side chain has the structure represented by the following formula (4).

(4)

wherein A represents a nitrogen-containing n-membered ring which bonds to the main chain through an organic group at 3-position to n-position thereof, and B represents O, N, S or an organic group which may include those. Specifically, the above-described compounds are preferably used as A. Examples of B specifically include oxygen atom, sulfur atom, amino group, and an alkylene group having 1 to 20 carbon atoms, which may contain O, N or S. The oxygen atom, sulfur atom and amino group form ester group, thioester group and amido group in combination with the adjacent carbonyl group, respectively.

B is preferably amido group in combination with the adjacent carbonyl group, or an N-containing alkylene group having 1 to 10 carbon atoms.

The side chain having the structure represented by the above formula (4) preferably has the structure represented by the following formula (5) or (6).

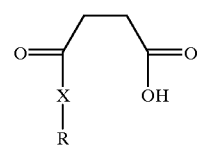

(5)

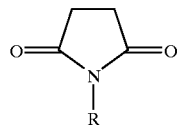

(6)

wherein R represents a nitrogen-containing n-membered ring which bonds to the main chain through an organic group at 3-position to n-position thereof, and X represents O, S or NR' wherein R' represents H or an alkyl group having 1 to 10 carbon atoms.

The above formula (5) shows that X and R are directly bonded, but an hydrocarbon group having 1 to 10 carbon atoms may be present therebetween.

The proportion of the side chain moiety constituted by those groups is preferably 0.1 to 50 mol %, more preferably 1 to 15 mol %, per 100 mol % of the main chain moiety. This proportion is that the introduced monomer of the side chain moiety is about 0.1 to 35 mol % per unit mole of isoprene monomer in the case, for example, that the main chain moiety is isoprene rubber.

Within this range, interaction of those side chains between molecules or in the molecule is well balanced, and as a result, the thermoplastic elastomer having very high tensile strength at crosslinked state and rubber elasticity can be obtained. This thermoplastic elastomer is heated to 120° C. or higher to dissociate a three-dimensional crosslinked structure, thereby flowability is imparted. This is considered that interaction of side chains each other is weakened. If the proportion of the side chain moiety is less than 0.1 mol % per 100 mol % of the main chain moiety, strength at crosslinked state is not sufficient, and if it exceeds 50 mol %, rubber elasticity is lost, which are not preferable.

The ratio of the carbonyl-containing group to the nitrogen-containing n-membered ring-containing group is not particularly limited, but is preferably 2:1 because of easy occurrence of complementary interaction.

The thermoplastic elastomer according to the fifth aspect of the present invention preferably has its glass transition temperature ($T_g$) of 25° C. or lower when it is desired to obtain the desired rubber elasticity at room temperature.

A method for producing the thermoplastic elastomer according to the fifth aspect of the present invention is not particularly limited, and the polymer can be synthesized by the general methods.

Among the thermoplastic elastomers according to the fifth aspect, the elastomer having the carbonyl-containing group and the nitrogen-containing n-membered ring-containing group in the same side chain can be obtained by, for example, reacting a carbonyl-containing group-modified product of the elastomeric polymer with a compound capable of introducing the nitrogen-containing n-membered ring-containing group, thereby covalently bonding the carbonyl-containing group and the nitrogen-containing n-membered ring-containing group. Further, it is possible to use a method such that compounds capable of introducing the carbonyl-containing group and the nitrogen-containing n-membered ring-containing group, respectively, are previously bonded to each other, and the bonded compounds are bonded to the side chain of the elastomeric polymer.

In the case of synthesizing the thermoplastic elastomer having the carbonyl-containing group and the nitrogen-containing n-membered ring-containing group respectively in the independent side chain, a monomer capable of forming the main chain may be copolymerized with copolymerizable monomers capable of introducing the above groups to directly produce the thermoplastic elastomer, or the main chain (elastomeric polymer) may previously be formed by polymerization or the like, and then may be graft-modified with compounds capable of introducing the above groups.

It can be confirmed by generally used analytical means such as NMR or IR analysis if each group in the side chain of the thermoplastic elastomer is independently bonded or is bonded in combination, in each of the production methods described above.

The thermoplastic elastomer according to the fifth aspect is preferably that the carbonyl-containing group and the nitrogen-containing n-membered ring-containing group are bonded to the same side chain of the elastomeric polymer previously formed, and is more preferable that the elastomeric polymer having a cyclic acid anhydride group in the side chain is reacted with the nitrogen-containing n-membered ring compound at a temperature that the nitrogen-containing n-membered ring compound can be chemically bonded (for example, covalent bond, ionic bond) to the cyclic acid anhydride group. JP-A-2000-169527 (publication date: Jun. 20, 2000) by the present applicant specifically describes the production of the thermoplastic elastomer according to the fifth aspect.

In the thermoplastic elastomer composition according to the fifth aspect of the present invention, the nitrogen-containing n-membered ring-containing group is bonded to the main chain directly or through an organic group at 3-position to n-position thereof. That is, in the side chain having the structure represented by the above formula (4), the nitrogen-containing n-membered ring-containing group A is bonded to the organic group B at 3-position to n-position thereof. Further, in the side chain represented by the above formula (5), the nitrogen-containing n-membered ring-containing group R is bonded to X at 3-position to n-position thereof. In the side chain represented by the above formula (6), the nitrogen-containing n-membered ring-containing group R is bonded to N at 3-position to n-position thereof.

If the nitrogen-containing n-membered ring-containing group is bonded to the main chain at other side, for example, 2-position as in the organic polymer disclosed in JP-A-8-239583, through an organic group, it is considered that an intramolecular chelate is liable to form between nitrogen atom of the nitrogen-containing n-membered ring-containing group and the carbonyl group in the same side chain in the molecule, thereby hydrogen bond is formed, and nitrogen atom and carbonyl group used in the intermolecular hydrogen bond, i.e., hydrogen bond between nitrogen atom of the nitrogen-containing n-membered ring-containing group, and carbonyl group, present in the side chain of the different thermoplastic elastomers, are decreased. As a result, it is considered that effective intermolecular hydrogen bond decreases, and hardness of the thermoplastic elastomer decreases. Even in the case where the nitrogen-containing n-membered ring-containing group and the carbonyl-containing group are bonded to the main chain respectively as the respective independent side chains, if the nitrogen-containing n-membered ring-containing group is bonded to the main chain at 2-position, nitrogen atom in the nitrogen-containing n-membered ring is present at the side nearer the main chain, and it is considered difficult to form hydrogen bond with the carbonyl group present in the side chain of other thermoplastic elastomer. Contrary to this, in the thermoplastic elastomer composition according to the fifth aspect of the present invention, the nitrogen-containing n-membered ring-containing group is bonded to the main chain at 3-position to n-position thereof. Therefore, even though the nitrogen-containing n-membered ring-containing group and the carbonyl group are present in the same side chain, nitrogen atom and carbonyl group in a heterocycle are more apart than the case of bonding at 2-position, so that it is difficult to form hydrogen bond in the molecule. Further, even in the case where the nitrogen-containing n-membered ring-containing group and the carbonyl group form the respective side chains independently, nitrogen atom of the heterocycle is present while apart from the main chain, showing a structure which is liable to form hydrogen bond with carbonyl group in other thermoplastic elastomer. By this structure, the thermoplastic elastomer composition according to the fifth aspect of the present invention is that hydrogen bond is liable to be formed between nitrogen atom and carbonyl group of a heterocycle present in the side chain of different thermoplastic elastomers. As a result, the thermoplastic elastomer composition obtained has high hardness, and is therefore considered suitable for use as an elastic material and the like.

In the thermoplastic elastomer composition according to the fifth aspect of the present invention, compound of at least one metal element selected from the group consisting of Group 2A, Group 3A, Group 4A, Group 5A, Group 6A, Group 7A, Group 8, Group 1B, Group 2B, Group 3B, Group 4B and Group 5B in the Periodic Table according to the IUPAC nomenclature, 1970 (that is, Group 2, Group 3, Group 4, Group 5, Group 6, Group 7, Group 8, Group 9, Group 10, Group 11, Group 12, Group 13, Group 14 and Group 15 in the Periodic Table according to IUPAC advice, 1990) is added to the thermoplastic elastomer. Metal elements of those Groups are preferably a metal element capable of forming coordinate bond with, for example, nitrogen atom having isolated electron pair of the heterocycle, selected from Zn(II), Co(II), Fe(II) Fe(III), Mn(II), Ni(II), Cu(II), Pb(II), Ca(II), Ba(II), Na(I), Al(III), K(I), Mg(II) and Li(I). Examples of the metal compound that can be used are saturated fatty acid salts having 20 or less carbon atoms such as formates, acetates or stearates; unsaturated fatty acids having 20 or less carbon atoms such as (meth)acryaltes; nitrates; carbonates; hydrogen carbonates; chlorides; oxides; hydroxides; and acetylacetonato complexes. However, halides such as fluorides, chlorides, bromides or iodides, oxides or saturated fatty acid salts having 20 or less carbon atoms are preferably used. That is, the metal compound is preferably at least one of $ZnX_2$, $CoX_2$, $FeX_2$, $FeX_3$, $MnX_2$, $NiX_2$, $CuX_2$, $PbX_2$, $CaX_2$, $BaX_2$, $NaX$, $AlX_3$, $KX$, $MgX_2$, $LiX$, $ZnO$, $CoO$, $FeO$, $Fe_2O_{37}$ $MnO$, $NiO$, $CuO$ and $PbO$ (X represents F, Cl, Br, I, OCOR or OH wherein R represents an alkyl group having 1 to 20 carbon atoms). Of those, stearates are particularly preferable in that it has high solubility in thermoplastic elastomer, it does not have deliquescence and it is easily dispersed uniformly in thermoplastic elastomer.

The content of metal compound is not particularly limited, and can appropriately be selected according to the kind or the like of thermoplastic elastomer and metal compound to be used. Different kinds of metal compounds may be added in combination. For example, in the case where $ZnCl$, is contained in a thermoplastic elastomer in which nitrogen-containing n-membered ring is 1,2,4-triazole ring as shown in the examples, if $ZnCl_2$ is contained in the proportion of about 0.1 to 2 mol per 1 mol of triazole ring in the thermoplastic elastomer, its interaction improves. In particular, when $ZnCl_2$ is contained in the proportion of 1 mol (equimole), its maximum effect is achieved. Formation of crosslinkage and dissociation of crosslinking can repeatedly be reproduced according to acting temperature caused by that the thermoplastic elastomer contains the carbonyl group and the nitrogen-containing n-membered ring in the side chain, and mechanical properties, in particular shape retention, are improved without deterioration of the characteristic of excellent recycle property. Further, for example, in the case that at least one of compounds of Mn(II), Fe(II), Co(II), Ni(II) and Cu(II) is contained in a thermoplastic elastomer in which the nitrogen-containing n-membered ring is triazole ring, if those metal compounds are contained in the proportion of about 0.05 to 2 mol (total amount in the case of containing a plurality of metal compounds) per one mol of triazole ring in the thermoplastic elastomer, interaction between the thermoplastic elastomer and the metal compound improves. In particular, when the metal compound is contained in the proportion of 1 mol (equimole), its maximum effect is achieved. Mechanical properties, in particular shape retention, are improved without deterioration of recycle property.

A method for compounding the metal compound with the thermoplastic elastomer is not particularly limited, and any optional methods can be employed. For example, there are a method of adding the metal compound at the time of melt molding the thermoplastic elastomer, a method of directly mixing the thermoplastic elastomer and the metal compound and using the resulting mixture in melt molding or the like, and a method of mixing the thermoplastic elastomer and the metal compound in a solvent, removing the solvent, and recovering the composition.

In the thermoplastic elastomer composition according to the fifth aspect of the present invention obtained above, strong interaction generates between the thermoplastic elastomer and the metal compound at the time of compounding the metal compound with the thermoplastic elastomer as described above, and mechanical properties, in particular compression set, are improved. This is considered that a coordiante bond, occasionally ionic bond, are formed between isolated electron pair of nitrogen atom in nitrogen-containing n-membered ring of the side chain of the thermoplastic elastomer, unshared electron pairs on oxygen of carbonyl group (—CO—) and the like, and metal ion, thereby strong cohesive structure involving minute crystal structure formation is formed in the thermoplastic elastomer.

<Uses etc.>

The thermoplastic polymer and its composition of the present invention having the above-described properties, and the thermoplastic elastomer composition according to the fifth aspect of the present invention having the above-described properties can be used in, for example, various vulcanized rubbers, utilizing its rubber elasticity. Further, when those are contained in hot-melt adhesives, heat resistance and recycle property can be improved. In particular, those are suitably used in surrounding trims of automobiles, such as tread and carcass of tires; exterior parts such as radiator grill, side molding, garnish (pillar, rear, cowl top), aeropart (air dam, spoiler), wheel cover, weather strip, cowbelt grill, air outlet louver, air scoop, hood bulge, ventilator part, anticorrosion countermeasure part (overfender, side seal panel), molding (window, hood, door belt), marks; interior window flame parts such as door, light, weather strip of wiper, glassrun, glass-run channel; air duct hose, radiator hose, break hose; lubricant-series parts such as crankshaft seal, valve stem seal, head cover gasket, A/T oil cooler hose, transmission oil seal, P/S hose, P/S oil seal; fuel-series parts such as hose for fuel, emission control hose, inlet filler hose, diaphragms; vibration-proof parts such as engine mount, intank pump mount; boots such as CVJ boot, rack & pinion boot; air conditioning parts such as A/C hose, A/C seal; belt parts such as timing belt, belt for supplementary machine; sealers such as windshield sealer, vinyl plastic sol sealer, anaerobic sealer, body sealer, spot weld sealer; and the like.

When those are contained as a rubber modifier such as flow preventive, in resins or rubbers causing cold flow at room temperature, flow in extrusion or cold flow can be prevented.

The thermoplastic polymer of the present invention can be mixed with carbon black and used to be as a composition. The thermoplastic elastomer composition according to the fifth aspect of the present invention can also be mixed with carbon black and used.

Carbon black is appropriately be selected according to the use. In general, carbon black is classified into hard carbon and soft carbon based on a particle size of carbon black. The soft carbon has low reinforcing property to rubbers, and the hard carbon has strong reinforcing property to rubbers. In the present invention, hard carbon having strong reinforcing property is preferably used, and is added in an amount of 10 to 70 parts by weight, preferably 20 to 60 parts by weight, more preferably 30 to 50 parts by weight, per 100 parts by weight of the thermoplastic polymer or thermoplastic elastomer.

Other reinforcing agents such as silica, age resistors, antioxidants, pigments and the like can be added within the range where the object of the present invention is not impaired.

Examples of other reinforcing agents include fumed silica, calcined silica, precipitated silica, crushed silica, fused silica, diatomaceous earth, iron oxide, zinc oxide, titanium oxide, barium oxide, magnesium oxide, calcium carbonate, magnesium carbonate, zinc carbonate, agalmatolite clay, kaolin clay and calcined clay. The other reinforcing agent is added in an amount of 20 to 80 parts by weight, preferably 30 to 60 parts by weight, per 100 parts by weight of the thermoplastic polymer or thermoplastic elastomer.

When silica is used as reinforcing agent, silane coupling agents can be used together. Examples of the silane coupling agents include bis (triethoxysilylpropyl) tetrasulfide (Si 69), γ-mercaptopropyltrimethoxysilane, vinyltrimethoxysilane and the like.

Examples of the age resistor include hindered phenol type compounds, and aliphatic and aromatic hindered amine type compounds. The age resistor is added in an amount of 0.1 to 10 parts by weight, preferably 1 to 5 parts by weight, per 100 parts by weight of the thermoplastic polymer or thermoplastic elastomer.

Examples of the antioxidant include butyl hydroxytoluene (BHT) and butyl hydroxyanisole (BHA). The antioxidant is added in an amount of 0.1 to 10 parts by weight, preferably 1 to 5 parts by weight, per 100 parts by weight of the thermoplastic polymer or thermoplastic elastomer.

Examples of the pigment include inorganic pigments such as titanium dioxide, zinc oxide, ultramarine blue, red iron oxide, lithopone, lead, cadmium, iron, cobalt, aluminum, chlorides or sulfates; and organic pigments such as azo pigments or copper phthalocyanine pigments. The pigment is added in an amount of 0.1 to 10 parts by weight, preferably 1 to 5 parts by weight, per 100 parts by weight of the thermoplastic polymer or thermoplastic elastomer.

The thermoplastic polymer of the present invention and the thermoplastic elastomer according to the fifth aspect of the present invention can self-crosslink, but vulcanizing agents, vulcanization assistants, vulcanization accelerators or the like can be used together within the range where the object of the present invention is not impaired.

Examples of the vulcanizing agent include sulfur type vulcanizing agents such as powdered sulfur, precipitating sulfur, highly dispersible sulfur, surface treated sulfur, insoluble sulfur, dimorpholine disulfide or alkylphenol disulfide; zinc white, magnesium oxide, litharge, p-quinone dioxime, p-dibenzoylquinone dioxime, tetrachloro-p-benzoquinone, poly-p-dinitrosobenzene and methyline dianiline.

Examples of the vulcanization assistant include fatty acids such as acetyl acid, propionic acid, butanoic acid, stearic acid, acrylic acid or maleic acid; and fatty acid zinc such as zinc acetylate, zinc propionate, zinc butanoate, zinc stearate, zinc acrylate or zinc maleate.

Examples of the vulcanization accelerator include thiuram type compounds such as tetramethylthiuram disulfide (TMTD) or tetraethylthiuram disulfide (TETD); aldehyde-ammonia type compounds such as hexamethyelene tetramine; guanidine type compounds such as diphenyl guanidine; thiazole type comppounds such as dibenzothiazyl disulfide (DM); and sulfenamide type compounds such as cyclohexylbenzothiazyl sulfenamide. Alkylphenolic resins, halides thereof and the like can also be used.

When the thermoplastic polymer of the present invention and the thermoplastic elastomer composition according to the fifth aspect of the present invention contain carbon black or the like, tensile strength, tear strength and bending strength are further improved, and they can suitably be used in uses of such as tires, hoses, belts, sheets, vibration-proof rubbers, rollers, linings, rubberized fabrics, sealing materials, gloves or glare-proof materials.

EXAMPLES

The present invention is described in more detail by reference to the following examples, but the invention is not limited to those examples.

<Synthesis of Thermoplastic Polymer of First Aspect>

0.551 g of 3-Amino-1,2,4-triazole (6.55 mmol) was added to commercially available maleic anhydride-modified isoprene rubber (degree of modification: 2.7 mol %, LIR-410A, a product of Kraray) of 12.73 g (6.55 mmol), and the resulting mixture was stirred under heating at 150° C. for 4 hours.

After confirming that a homogeneous solution was formed, the solution was allowed to stand one night to obtain a gel-like reaction product. The reaction product was confirmed by NMR and IR to be thermoplastic polymer 1 having a structure represented by the following formula.

Hereinafter, the corresponding nitrogen-containing heterocycle-containing compounds were used in the same proportion to obtain thermoplastic polymers 2 to 8 having structures represented by the following formulae.

As a comparative compound, the above maleic anhydride-modified iproprene rubber and 4-aminopyridine were reacted in the same proportions to obtain thermoplastic polymer 9 having a structure represented by the following formula. As further comparative compound, the above maleic anhdride-modified iproprene rubber and furfurylamine were reacted in the same proportions to obtain thermoplastic polymer 10 having a structure represented by the following formula. Further, thermoplastic polymer 11 having a structure represented by the following formula was obtained in the same manner as above.

THERMOPLASTIC POLYMER 1
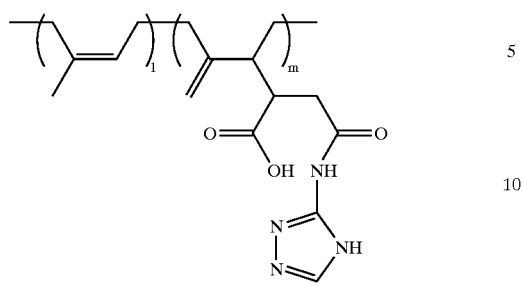
THERMOPLASTIC POLYMER 2
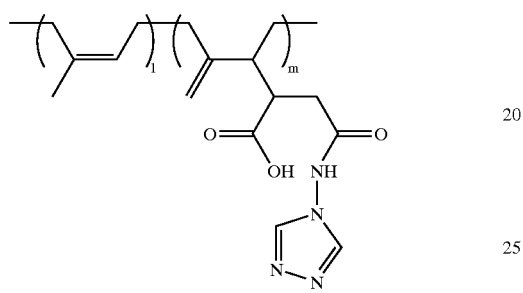
THERMOPLASTIC POLYMER 3
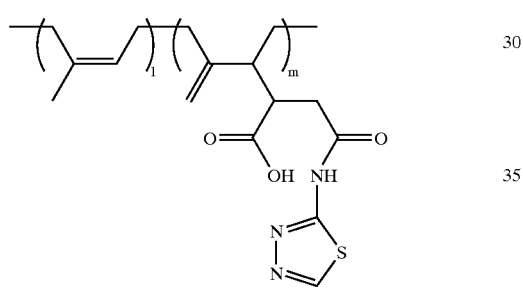
THERMOPLASTIC POLYMER 4
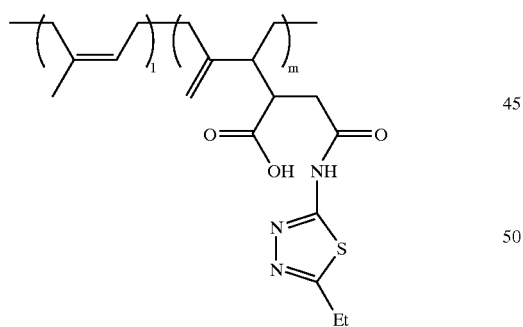
THERMOPLASTIC POLYMER 5
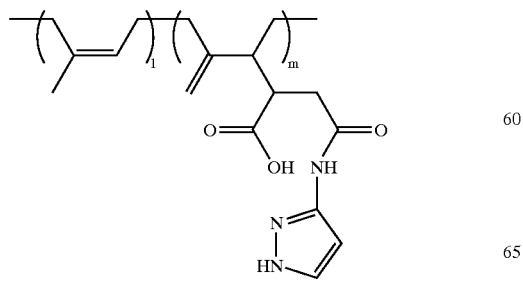
-continued
THERMOPLASTIC POLYMER 6
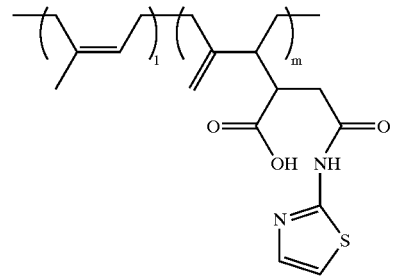
THERMOPLASTIC POLYMER 7
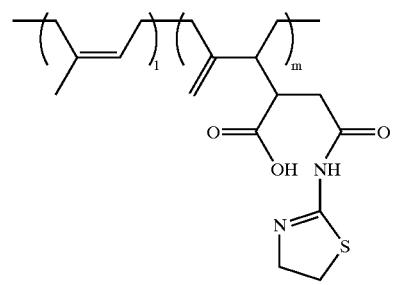
THERMOPLASTIC POLYMER 8
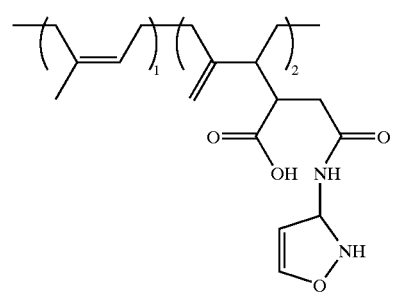
THERMOPLASTIC POLYMER 9
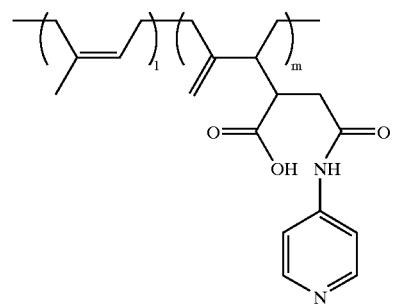
THERMOPLASTIC POLYMER 10
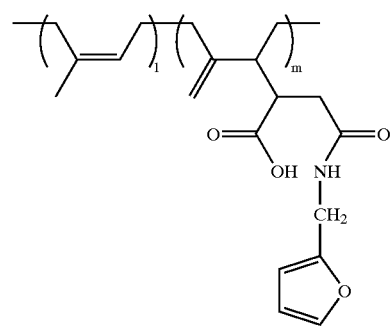

-continued

THERMOPLASTIC POLYMER 11

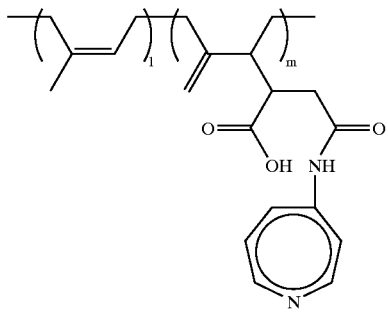

wherein l:m≡358:10

Examples 1 to 8

JIS A hardness was measured for thermoplastic polymers 2 to 8, and the appearance at 120° C. heating was observed. The results obtained are shown in Table 1.

<Measurement of JIS A Hardness>

Each of thermoplastic polymers 1 to 8 was press-molded at 150° C. for 60 minutes to obtain the flat plate sample having a size of 1 cm (thickness)×5 cm×5 cm. Three of each flat plate sample obtained were piled and the JIS A hardness was measured according to JIS K6253.

Comparative Example 1

Using thermoplastic polymer 9, the JIS A hardness was measured and the appearance at 120° C. heating was observed, in the same manners as in the Examples.

Comparative Example 2

Using thermoplastic polymer 10, the JIS A hardness was measured and the appearance at 120° C. heating was observed, in the same manners as in the Examples.

Comparative Example 3

Using thermoplastic polymer 11, the JIS A hardness was measured and the appearance by heating at 120° C. was observed, in the same manners as in the Examples.

case of having pyridyl group of 6-membered ring (Comparative Example 1), the case of having furan ring including no nitrogen (Comparative Example 2) and the case of having 7-membered ring. Further it is apparent that the thermoplastic polymers having the nitrogen-containing heterocycle bonded at 3-position or 4-position thereof (Examples 1, 2, 5 and 8) have high effect in hardness improvement as compared with the thermoplastic polymers having the heterocycle bonded at 2-position (Examples 3, 4, 6 and 7).

<Synthesis of Thermoplastic Polymer of Third Aspect>

Thermoplastic polymer 12 according to the third aspect of the present invention was synthesized as follows.

Maleic anhydride-modified EPDM (degree of modification: 0.8 mol %, amount of maleic anhydride introduced: 6.63 g, trial sample by DSM Co.) of 301.2 g (0.0676 mol: amount of acid anhydride) was added to a pressure kneader heated to 120° C., and masticated for a short period of time. 3-amino-1,2,4-triazole of 5.68 g (0.0676 mol) was then added, and mixed for 20 minutes.

It was confirmed from IR analysis that the product obtained was thermoplastic polymer 12 having introduced therein a triazole ring having a structure represented by the following formula.

THERMOPLASTIC POLYMER 12

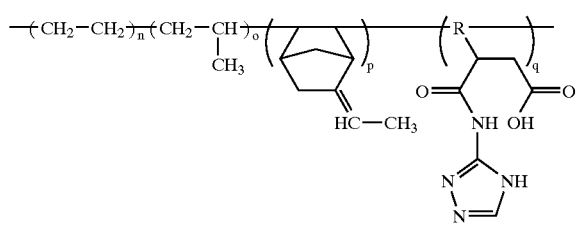

wherein (n+o+p):q=99.2:0.8, and R represents a hydrocarbon group having 1 to 12 carbon atoms.

Similarly, thermoplastic polymer 13 according to the third aspect of the present invention was synthesized.

Maleic anhydride-modified BPM (degree of modification: 0.2 mol %, amount of maleic anhydride introduced: 1.50 g, Toughmer MP0610, a product of Mitsui Chemical Co.) of 300.0 g (0.0153 mol: amount of acid anhydride) was added to a pressure kneader heated to 150° C., and masticated for a short time. 3-amino-1, 2,4-triazole of 1.29 g (0.0153 mol) was then added, and mixed for 20 minutes.

TABLE 1

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Thermoplastic polymer | 1 | 2 | 3 | 4 | 5 | 6 | 7 | 8 | 9 | 10 | 11 |
| JIS A hardness | 54 | 52 | 45 | 47 | 50 | 47 | 45 | 52 | 34 | Liquid | 12 |
| Appearance at 120° C. heating | Liquid | Liquid | Liquid | Liquid | Liquid | Liquid | Liquid | Liquid | Liquid | Liquid | Liquid |

It is apparent from Table 1 that thermoplastic polymers having 5-membered nitrogen-containing heterocycle-containing group of the present invention (Examples 1 to 8) have considerably high JIS A hardness as compared with the It was confirmed from IR analysis that the product obtained was thermoplastic polymer 13 having introduced therein a triazole ring having a structure represented by the following formula.

THERMOPLASTIC POLYMER 13

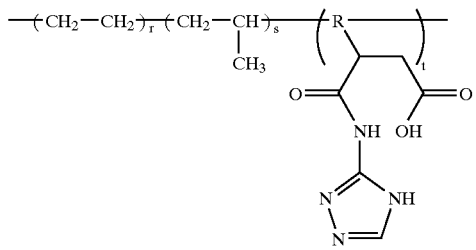

wherein (r+s):t=99.8:0.2, and R represents a hydrocarbon group having 1 to 12 carbon atoms.

Example 9

Using thermoplastic polymer 12, a flat plate sample was prepared in the same manner as above, and the following evaluation tests were conducted thereon.
<Tensile Test>
The polymer was pressed at 150° C. for 25 minutes to obtain a sheet having a thickness of 2 mm. No.3 dumbbell-shaped specimen was punched out of the sheet, and was subjected to a tensile test at a tensile speed of 500 mm/min according to JIS K6251. 50% modulus ($M_{50}$), 100% modulus ($M_{100}$), 200% modulus ($M_{200}$), 300% modulus ($M_{300}$), 400% modulus ($M_{400}$), breaking strength ($T_B$), breaking extension ($E_B$) and breaking energy (ENG) were measured at room temperature.
<Repeated Molding Test>
The polymer was press-molded with a cylindrical mold having a diameter of 2.8 mm and height of 1.2 mm at 160° C. for 20 minutes. The sample obtained was then finely cut, and finely cut pieces were again press-molded. It was evaluated if an integrated and seamless sample could be prepared. A sample was prepared by repeating the above procedure five times, and subjected to the same tensile test as above. The value obtained was compared to the initial value.

Example 10

Carbon black (N330, a product of Tokai Carbon Co.) 50 parts by weight was added to thermoplastic polymer 12 (100 parts by weight), and the resulting mixture was kneaded with a Banbury mixer at 160° C. until becoming sufficiently uniform. Tensile characteristic and repeated moldability were evaluated on the composition thus obtained in the same manner as in Example 9.

Example 11

Except for using thermoplastic polymer 13 in place of thermoplastic polymer 12, tensile characteristic and repeated moldability were evaluated thereon in the same manner as in Example 9.

Comparative Example 4

Unmodified EPDM (KELTAN 312, a product of DSM Co.) was used in place of thermoplastic polymer 12, and zinc white No. 3 (a product of Seido Kagaku K.K.), stearic acid (beads stearic acid, a product of Nippon Oils and Fats Co.), sulfur (powdered sulfur, a product of Karuizawa Seirensho), and Noccelar TS (tetramethylthiuram monosulfide, a product of Ouchishinko Chemical Industrial Co., Ltd.) and Noccelar M (2-mercaptobenzothiazole, a product of Ouchishinko Chemical Industrial Co., Ltd.) as accelerators were mixed in the proportions as shown in Table 2, and kneaded with a Banbury mixer to obtain a uniform composition. Tensile characteristic and repeated moldability were evaluated on the composition thus obtained in the same manner as in Example 9.

Comparative Example 5

A composition was obtained in the same manner as in Comparative Example 4 except for adding carbon black 50 parts by weight. Tensile characteristic and repeated moldability were evaluated on the composition thus obtained in the same manner as in Example 9.

The results obtained are shown in Table 2. In the Table, "n times or more" means that physical properties did not change even though repeating molding n times, and it is possible to further repeat re-molding. Further, "x" indicates that re-molding could not be conducted.

It is understood from Table 2 that the thermoplastic polymer according to the third aspect of the present invention and the composition containing the same (Examples 9 to 11) have excellent strength characteristics and secure moldability at heating.

TABLE 2

(parts by weight)

| | Example 9 | Example 10 | Example 11 | Comparative Example 4 | Comparative Example 5 |
|---|---|---|---|---|---|
| Thermoplastic polymer 12 | 100 | 100 | | | |
| EPDM | | | | 100 | 100 |
| Thermoplastic polymer 13 | | | 100 | | |
| Carbon black | | 50 | | | 50 |
| Zinc white No. 3 | | | | 5 | 5 |
| Stearic acid | | | | 1 | 1 |
| Sulfur | | | | 1.5 | 1.5 |
| Noccelar TS | | | | 1 | 1 |
| Noccelar M | | | | 0.5 | 0.5 |
| (1) Tensile test (initial) | | | | | |
| $M_{50}$ (MPa) | 0.6 | 2.8 | 0.5 | 0.7 | 3.1 |
| $M_{100}$ (MPa) | 0.9 | 5.0 | 0.8 | 1.0 | 5.6 |
| $M_{200}$ (MPa) | 1.2 | 11.5 | 1.0 | 1.5 | 12.3 |
| $M_{300}$ (MPa) | 1.6 | 17.2 | 1.5 | — | 18.9 |
| $M_{400}$ (MPa) | 2.1 | — | 2.0 | — | — |
| $T_B$ (MPa) | 2.9 | 19.6 | 3.0 | 2.1 | 20.7 |
| $E_B$ (%) | 594 | 340 | 610 | 283 | 320 |
| ENG (MPa) | 9 | 30 | 8 | 3 | 32 |
| (2) Repeated molding test | more than 6 times | more than 6 times | more than 6 times | x | x |
| (3) Tensile test (after re-molding) | | | | | |
| $M_{50}$ (MPa) | 0.7 | 2.9 | 0.5 | — | — |
| $M_{100}$ (MPa) | 1.0 | 5.2 | 0.9 | — | — |
| $M_{200}$ (MPa) | 1.3 | 11.7 | 1.1 | — | — |
| $M_{300}$ (MPa) | 1.7 | 16.8 | 1.6 | — | — |
| $M_{400}$ (MPa) | 2.0 | — | 2.1 | — | — |
| $T_B$ (MPa) | 3.0 | 20.1 | 2.9 | — | — |
| $E_B$ (%) | 590 | 345 | 600 | — | — |
| ENG (MPa) | 9 | 31 | 8 | — | — |

Examples 12 to 17 and
Comparative Examples 6 to 11

Components in the formulation shown in Table 3 were kneaded at 130 to 200° C. for about 30 minutes in the same manner as in Example 9 to obtain thermoplastic polymers of Examples 12 to 17. The following evaluation tests were conducted on those thermoplastic polymers. Further, the following evaluation tests were also conducted on polymer components (Comparative Examples 6 to 11) used in Examples 12 to 17.

<Hardness Test>

A thermoplastic polymer (or polymer component) was pressed at 150° C. for 5 minutes to obtain a sheet having a thickness of 2 mm. Sheets thus obtained were piled and heat pressed at 150° C. for 30 minutes to obtain a Lubke sample.

Hardness of the sample was measured at room temperature using JIS A type hardness meter. This test was performed according to JIS K6253.

<Tensile Test>

Test was conducted in the same manner as in the tensile test in Example 9.

<High Temperature Tensile Test>

A thermoplastic polymer (or polymer component) was pressed at 150° C. for 5 minutes to obtain a sheet having a thickness of 2 mm. The sheet thus prepared was punched with dumbbell No. 3. The test specimen thus obtained was subjected to tensile test at a tensile speed of 500 mm/min. Breaking strength ($T_B$) and breaking extension ($E_B$) were measured in 100° C. thermostatic chamber. This test was performed according to JIS K6251.

<Compression Set (C-Set)>

A thermoplastic polymer (or polymer component) was pressed at 150° C. for 5 minutes to obtain a sheet having a thickness of 2 mm. Sheets thus obtained were piled and heat pressed at 150° C. for 30 minutes to obtain a Lubke sample.

The Lubke sample was compressed by 25% with an exclusive jig and allowed to stand at 70° C. for 22 hours. Compression set of the sample thus treated was measured. This test was performed according to JIS K6262.

<Overflow Initiation Temperature>

Using Koka type flow tester, overflow initiation temperature was measured with temperature rising method. Die had a diameter of 1 mm and a length of 10 mm. Amount of the sample was 2 g, load was 100 kgf, and temperature rising rate was 5° C./min.

<Melt Flow Rate (M.F.R.)>

Measured with melt indexer. Die had a diameter of 2.095 mm and a length of 8 mm.

Measurement was conducted under the conditions that measurement temperature is 230° C., amount of sample is 5 g, remaining heat time is 6 minutes, and load is 10 kgf.

The results obtained are shown in Table 3.

It is understood from Table 3 that the thermoplastic polymer according to the third aspect of the present invention and its composition (Examples 12 to 17) have increased each strength as compared with the original polymer and its composition (Comparative Examples 6 to 11), and secure moldability at heating.

Polymer components in Table 3 (Mitsui Chemical TAFMER Species) are as follows.

MH7020: ethylene/butene type, density 0.872, rate of maleic anhydride introduced is not known but low.

MH5020: ethylene/butene type, density 0.866, rate of maleic anhydride introduced is not known but low.

TX-1032: ethylene/butene type, density 0.874, rate of maleic anhydride introduced is not known but high.

TX-1024: ethylene/propylene type, density 0.870, rate of maleic anhydride introduced is not known but low.

TX-1023: ethylene/propylene type, density 0.870, rate of maleic anhydride introduced is not known but high.

TX-1031: ethylene/propylene type, density 0.874, rate of maleic anhydride introduced is not known but high.

TABLE 3

(Part 1)

| | Comparative Example 6 | Comparative Example 7 | Comparative Example 8 | Comparative Example 9 | Comparative Example 10 | Comparative Example 11 |
|---|---|---|---|---|---|---|
| MH7020 | 100 | | | | | |
| MH5020 | | 100 | | | | |
| TX-1032 | | | 100 | | | |
| TX-1024 | | | | 100 | | |
| TX-1023 | | | | | 100 | |
| TX-1031 | | | | | | 100 |
| Aminotriazole | | | | | | |
| Hardness | 65.4 | 47.8 | 53.0 | 65.4 | 73.8 | 55.0 |
| $M_{100}$ (MPa) | 2.12 | 1.66 | 2.26 | 1.79 | 1.97 | 1.85 |
| $M_{300}$ (MPa) | 2.82 | 2.98 | 2.87 | 2.14 | 2.54 | 2.06 |
| $T_B$ (MPa) | 6.32 | 3.92 | 6.93 | 5.07 | 7.87 | 4.22 |
| $E_B$ (%) | 983.1 | 901.0 | 916.7 | 951.9 | 857.4 | 865.0 |
| High temperature $T_B$ (MPa) | 0.29 | 0.44 | 0.40 | 0.26 | 0.58 | 0.38 |
| High temperature $E_B$ (%) | 170.0 | 230.0 | 90.0 | 140.0 | 130.0 | 160.0 |
| C-Set (%) | 103.7 | 100.2 | 102.4 | 102.4 | 89.2 | 105.4 |
| Overflow initiation Temperature (° C.) | 111.6 | 127.5 | 105.2 | 100.9 | 133.6 | 102.5 |
| M.F.R (g/10 min) | 13.1 | 10 | 6.6 | 23.4 | 4.6 | 23.6 |

(Part 2)

| | Example 12 | Example 13 | Example 14 | Example 15 | Example 16 | Example 17 |
|---|---|---|---|---|---|---|
| MH7020 | 100 | | | | | |
| MH5020 | | 100 | | | | |
| TX-1032 | | | 100 | | | |
| TX-1024 | | | | 100 | | |
| TX-1023 | | | | | 100 | |
| TX-1031 | | | | | | 100 |
| Aminotriazole | 0.86 | 0.86 | 1.29 | 0.86 | 1.50 | 1.29 |
| Hardness | 69.4 | 60.0 | 53.0 | 74.4 | 74.4 | 69.4 |
| $M_{100}$ (MPa) | 2.29 | 1.89 | 2.72 | 1.83 | 2.18 | 2.07 |
| $M_{300}$ (MPa) | 3.17 | 2.06 | 4.3 | 2.07 | 3.15 | 2.81 |
| $T_B$ (MPa) | 8.84 | 5.74 | 7.34 | 4.21 | 7.53 | 4.39 |
| $E_B$ (%) | 930.0 | 996.7 | 826.7 | 872.5 | 802.1 | 713.3 |
| High temperature $T_B$ (MPa) | 0.52 | 0.65 | 0.71 | 0.32 | 0.77 | 0.57 |
| High temperature $E_B$ (%) | 220.0 | 200.0 | 130.0 | 80.0 | 230.0 | 140.0 |
| C-Set (%) | 91.0 | 82.6 | 83.7 | 91.7 | 76.3 | 87.6 |
| Overflow initiation Temperature (° C.) | 139.8 | 174.6 | 180.6 | 118.9 | 161.3 | 154.3 |
| M.F.R (g/10 min) | 0.8 | 0.2 | 0.1 | 2.7 | 0.04 | 0.5 |

<Synthesis of Thermoplastic Polymer of Fourth Aspect>

Example 18

Brominated butyl rubber (bromobutyl ×2, a product of Bayer Polysar B.N.V.) of 350.0 g (6.07 mol: butyl unit) was introduced in a pressure kneader heated to 80° C. After masticating for a short time, 3.5 g of N-(1,3-dimethylbutyl)-N'-phenyl-p-phenylenediamine (1.0 phr), 35.1 g of maleic anhydride (0.358 mol) and 38.0 g of xylene (0.358 mol) were added thereto, and the resulting mixture was mixed for 10 minutes. The mixture was once taken out of the kneader, and temperature of the kneader was set to 190° C. The mixture was introduced into the kneader and kneaded for 40 minutes. Part of the rubber thus obtained was dissolved in toluene, and re-precipitation operation was conducted to purify the same. IR analysis and $^1$H-NMR analysis were conducted using the purified product. As a result, introduction of an acid anhydride skeleton was confirmed, and the introduction ratio was 2.0 mol %.

The maleic anhydride-gragted butyl rubber of 357.7 g (0.113 mol: amount of acid anhydride), 3-amino-1,2,4-triazole of 9.51 g (0.113 mol) and N-(1,3-dimethylbutyl)-N'-phenyl-p-phenylenediamine of 3.54 g (1.0 phr) were kneaded in a pressure kneader set to a temperature of 100° C. for 20 minutes to obtain a thermoplastic polymer. IR analysis was performed, and introduction ratio of triazole ring was confirmed.

The same evaluation tests as in Example 9 were conducted on the thermoplastic polymer obtained.

Comparative Example 12

The brominated butyl rubber used in Example 18 was vulcanized by sulfur at 160° C. for 20 minutes, and the same evaluation tests as in Example 9 were conducted on the obtained vulcanized rubber.

The results obtained are shown in Table 4.

As shown in Table 4, the thermoplastic polymer according to the fourth aspect of the present invention in which 3-amino-1,2,4-triazole was reacted on the butyl rubber having acid anhydride skeleton (Example 18) shows heat reversible property, and shows mechanical strength higher than the vulcanized butyl rubber (Comparative Example 12). In particular, improvement in modulus of 200% elongation or more than, tensile strength and elongation at break is remarkable.

TABLE 4

|  | Comparative Example 12 | Example 13 |
|---|---|---|
| Brominated butyl rubber | 100 |  |
| Thermoplastic polymer |  | 100 |
| Stearic acid | 1 |  |
| Zinc white | 5 |  |
| Vulcanization accelerator | 1.25 |  |
| Sulfur | 0.5 |  |
| Tensile characteristics |  |  |
| $M_{50}$ (MPa) | 0.3 | 0.3 |
| $M_{100}$ (MPa) | 0.4 | 0.5 |
| $M_{200}$ (MPa) | 0.5 | 0.9 |
| $M_{300}$ (MPa) | 0.6 | 1.1 |
| $M_{400}$ (MPa) | 0.7 | 1.4 |
| $T_B$ (MPa) | 4.27 | 9.15 |
| $E_B$ (%) | 879.2 | >1000 |
| Repeated molding test | x | 3 times or more |

* Vulcanization conditions: 160° C. × 20 min
1) Bromobutyl x2, Bayer Polysar B., a product of N.V Co.
2) Beads stearic acid, Kiri, a product of Nippon Oils and Fats Co.
3) Zinc white No. 3, a product of Seido Kagaku Kogyo K.K.
4) Noccelar DM: Dibenzothiazyldisulfide, a product of Ouchishinko Chemical Indusrial Co., Ltd.
5) Oil-treated sulfur, a product of Karuizawa Seirensho <Synthesis of Thermoplastic Elastomer in Fifth Aspect>

3-amino-1,2,4-triazole of 0.551 g (6.55 mol) was added to commercially available maleic anhydride-modified isoprene rubber (rate of modification: 2.7 mol %, LIR-410A, a product of Kraray) of 12.73 g (6.55 mol), and the resulting mixture was stirred at 150° C. for 4 hours.

After confirming that a uniform solution was formed, the solution was allowed to stand overnight to obtain a gel-like reaction product. It was confirmed by NMR and IR that the reaction product was thermoplastic elastomer 1 having the structure represented by the following formula (7).

Thermoplastic elastomer 2 having the structure represented by the following formula (8) was synthesized by using 4-aminopyridine as a nitrogen-containing n-membered ring-containing compound in the same proportion in the same manner as described above.

As a comparative compound, the maleic anhydride-modified isoprene rubber and 2-aminomethylpyridine were reacted in the same proportion to obtain thermoplastic elastomer 3 having the structure represented by the following formula (9).

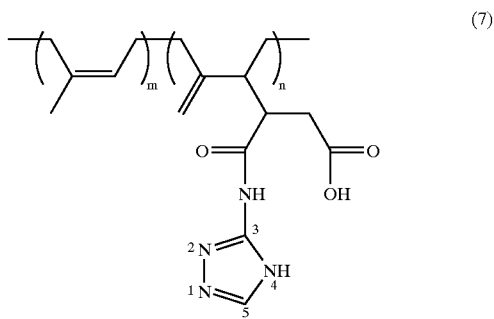

(7)

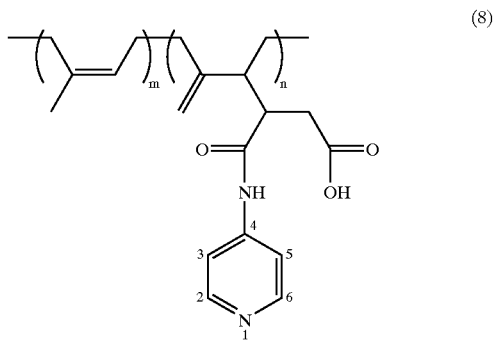

(8)

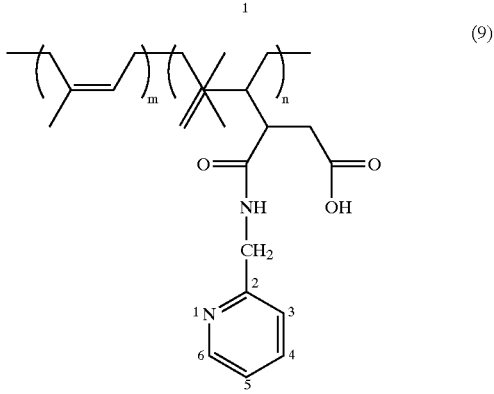

(9)

wherein m:n=358:10

Examples 19 to 29

Each of thermoplastic elastomers 1 and 2 obtained was dissolved in a solvent, a metal compound was added thereto in an amount shown in Table 5 to confirm its compatibility in the following manner. When the solvent was distilled off, solidification immediately occurred, and each thermoplastic elastomer composition containing a metal compound was obtained. Its JIS A hardness was measured for each thermoplastic elastomer obtained as follows, and its shape retention was then measured therefore as follows.

<Confirmation of Compatibility>

After adding a metal compound to the elastomer composition it was visually confirmed. In Table 5, the case that the metal compound and the elastomer were merely mixed is indicated as ○ and the case that those were uniformly mixed is indicated as ⊙.

<Measurement of JIS A Hardness>

Each thermoplastic elastomer composition was press-molded at 150° C. for 60 minutes to obtain a flat plate sample having a size of 1 cm (thickness)×5 cm×5 cm. Three flat plate samples were piled and JIS A hardness was measured according to JIS K6253.

<Measurement of Shape Retention>

Each thermoplastic elastomer composition was press-molded at 100° C. for 20 minutes to obtain a cylindrical sample having a diameter of 29 mm and a thickness of 12.5 mm. A glass plate was placed on the sample, and a 500 g weight was placed thereon. Deformation amount per every time shown in Table 5 was measured, and measurement was conducted after 48 hours. Shape retention was determined by the deformation amount obtained using the following equation.

Shape retention (%)=(thickness after given time/thickness at measurement initiation)×100

Comparative Example 13

Metal compound was not added to thermoplastic elastomer, and JIS A hardness and shape retention were measured in the same manners as in the Examples.

Comparative Example 14

Using thermoplastic elastomer 3, a composition was obtained in the same manners as in the Examples. Using the composition obtained, compatibility was confirmed, and JIS A hardness and shape retention were measured, in the same manners as in the Examples.

The results obtained are shown in Table 5.

As is apparent from Table 5, the thermoplastic elastomer compositions using a compound having a nitrogen-containing n-membered ring-containing group bonded to a main chain at 3-position or 4-position through an organic group according to the fifth aspect of the present invention (Examples 19 to 29) had markedly high JIS A hardness as compared with the composition using a compound having a nitrogen-containing n-membered ring-containing group bonded to a main chain at 2-position through an organic group (Comparative Example 14). Further, the thermoplastic elastomers compositions according to the fifth aspect of the present invention (Examples 19 to 29) had high shape retention and also had less decrease in the compression shape retention with the passage of time because of containing a metal compound, as compared with the thermoplastic elastomers having no metal compound added thereto (Comparative Example 13).

TABLE 5

(Part 1)

|  | Example 19 | Example 20 | Example 21 | Example 22 | Comparative Example 13 |
|---|---|---|---|---|---|
| Thermoplastic elastomers | 1 | 1 | 1 | 1 | 1 |
| Metal compound | ZnBr$_2$ | FeCl$_3$ | CoCl$_2$ | MnCl$_2$ |  |
| Addition amount | 1 | 1 | 1 | 1 | — |
| Compatibility | ○ | ○ | ○ | ○ | — |
| Shape retention (%), 500 g, Room temperature |  |  |  |  |  |
| After 1 hour | 98 | 78 | 68 | 75 | 62 |
| After 4 hours | 99 | 65 | 48 | 63 | 43 |
| After 18 hours | 98 | 65 | 43 | 55 | 33 |
| After 24 hours | 97 | 48 | 36 | 47 | 25 |
| After 48 hours | 97 | 41 | 31 | 42 | 25 |

(Part 2)

|  | Example 23 | Example 24 | Example 25 | Example 26 | Example 27 |
|---|---|---|---|---|---|
| Thermoplastic elastomers | 1 | 1 | 1 | 1 | 1 |
| Metal compound | ZnCl$_2$ | ZnCl$_2$ | ZnCl$_2$ | ZnCl$_2$ | ZnO |
| Addition amount | 0.1 | 0.25 | 0.5 | 1.0 | 1.0 |
| Compatibility | ○ | ○ | ○ | ○ | ○ |
| Shape retention (%), 500 g, |  |  |  |  |  |
| After 1 hour | 91 | 92 | 97 | 99 | 91 |
| After 4 hours | 67 | 79 | 91 | 99 | 76 |
| After 18 hours | 60 | 63 | 85 | 99 | 65 |
| After 24 hours | 45 | 52 | 76 | 99 | 55 |
| After 48 hours | 38 | 45 | 67 | 99 | 39 |
| JIS A hardnesss | 54 | 56 | 58 | 68 | 50 |

(Part 3)

|  | Example 28 | Example 29 | Comparative Example 14 |
|---|---|---|---|
| Thermoplastic elastomers | 1 | 2 | 3 |
| Metal compound | Zn(OCOC$_{17}$H$_{35}$)$_2$ | ZnCl$_2$ | ZnCl$_2$ |
| Addition amount | 0.135 4 parts by weight | 1 | 1 |
| Compatibility | ⊙ | ○ | ○ |
| Shape retention (%), 500 g, room temperature |  |  |  |
| After 1 hour | 98 | 99 | Too soft to measure |
| After 4 hour | 93 | 99 |  |
| After 18 hour | 91 | 99 |  |
| After 24 hour | 89 | 99 |  |
| After 48 hour | 83 | 99 |  |
| JIS A hardness | 55 | 65 | 2 |

As described above, according to the present invention, excellent recycle property such that physical properties do not decrease by altering temperature even if formation of crosslinking and dissociation of crosslinking are repeatedly conducted can be imparted to an elastomeric polymer, by introducing a carbonyl-containing group and a nitrogen-containing 5-membered heterocycle-containing group into a side chain. Further, the polymer has a crosslinked structure which is considerably stable at room temperature, and has considerably high tensile strength.

In particular, when an elastomeric polymer having a diene moiety of less 5 mol %, such as EPM, EBM or EPDM; or butyl rubber or halogenated butyl rubber, is used as an elastomeric polymer, the effect obtained is further high.

Further, the thermoplastic elastomer composition according to the fifth aspect of the present invention is a composition such that nitrogen-containing n-membered ring-containing group of thermoplastic elastomers used is bonded to a main chain at 3-position to n-position directly or through an organic group. Therefore, such a composition has high hardness as compared with the case of bonding to a main chain at another position such as 2-position, and is therefore suitable for use in the field of an elastic material or the like. Further, the thermoplastic elastomer composition according to the fifth aspect of the present invention has a metal compound added thereto. Therefore, such a composition has an improved shape retention as compared with a thermoplastic elastomer before adding a metal compound thereto. As a result, physical properties do not decrease by altering temperature even if formation of crosslinking and dissociation of crosslinking are repeatedly conducted, and thus an excellent recycle property can be imparted.

What is claimed is:

1. A thermoplastic polymer comprising an elastomer as a main chain, in which a diene moiety is 5 mol % or less, and a side chain having at least one member selected from the group consisting of the following formulae (1), (2) and (3), which bonds to the main chain at α-position or β-position,

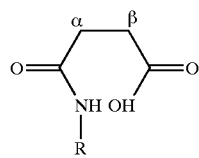
(1)

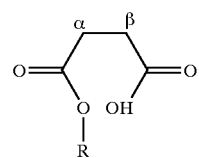
(2)

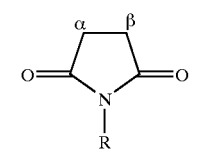
(3)

wherein R represents a nitrogen-containing heterocycle, wherein the proportion of side chain units is 0.1 to 50 mol % with respect to 100 mol % of the main chain monomer units and wherein the thermoplastic polymer reversibly forms a stable crosslinked structure at room temperature and dissociates the crosslinked structure at a temperature of 120° C. or higher.

2. The thermoplastic polymer of claim 1, wherein the nitrogen-containing heterocycle is a five-membered ring or a six-membered ring.

3. A rubber composition containing the thermoplastic polymer of claim 1.

4. A thermoplastic polymer comprising an ethylene-propylene copolymer (EPM), an ethylene-butene copolymer (EBM) or an ethylene-propylene-diene copolymer (EPDM) as a main chain, and a side chain having at least one member selected from the group consisting of the following formulae (1), (2) and (3), which bonds to the main chain at α-position or β-position,

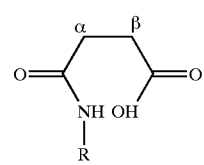
(1)

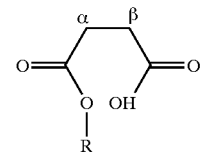
(2)

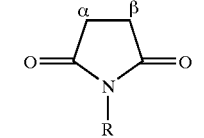
(3)

wherein R represents a nitrogen-containing heterocycle, wherein the proportion for the side chain moiety is 0.1 to 50 mol % with respect to 100 mol % of the main chain moiety and wherein the thermoplastic polymer reversibly forms a stable crosslinked structure at room temperature and dissociates the crosslinked structure at a temperature of 120° C. or higher.

5. The thermoplastic polymer of claim 4, wherein the nitrogen-containing heterocycle is a five-membered ring or a six-membered ring.

6. A rubber composition containing the thermoplastic polymer of claim 4.

* * * * *